(12) United States Patent
Sampei et al.

(10) Patent No.: US 8,874,972 B2
(45) Date of Patent: Oct. 28, 2014

(54) STORAGE SYSTEM AND METHOD FOR DETERMINING ANOMALY-OCCURRING PORTION

(75) Inventors: Akira Sampei, Kawasaki (JP); Fumio Hanzawa, Kawasaki (JP); Hiroaki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 13/371,510

(22) Filed: Feb. 13, 2012

(65) Prior Publication Data
US 2012/0254673 A1  Oct. 4, 2012

(30) Foreign Application Priority Data
Mar. 29, 2011  (JP) .................................. 2011-072572

(51) Int. Cl.
*G06F 11/00*  (2006.01)
*G06F 11/07*  (2006.01)

(52) U.S. Cl.
CPC ........ *G06F 11/0775* (2013.01); *G06F 11/0727* (2013.01); *G06F 11/0793* (2013.01)
USPC .......................................................... 714/42

(58) Field of Classification Search
CPC ............ G06F 11/0689; G06F 11/2007; G06F 11/201; G06F 11/2094
See application file for complete search history.

(56) References Cited

U.S. PATENT DOCUMENTS

| 6,073,218 A * | 6/2000 | DeKoning et al. ............ 711/150 |
| 7,823,047 B2 * | 10/2010 | Majima ........................ 714/774 |
| 8,281,179 B2 * | 10/2012 | Akutsu et al. .................... 714/3 |
| 2004/0268178 A1 * | 12/2004 | Fredin ............................. 714/6 |

FOREIGN PATENT DOCUMENTS

| JP | 2000-132413 A | 5/2000 |
| JP | 2009-205316 A | 9/2009 |

* cited by examiner

*Primary Examiner* — Charles Ehne
(74) *Attorney, Agent, or Firm* — Fujitsu Patent Center

(57) ABSTRACT

In a storage system, when a recovered error occurred upon access to a storage apparatus, a data redundancy determination unit determines whether data to be accessed has redundancy. When the data is determined to have no redundancy, an anomaly-occurring portion determination unit determines that the storage apparatus is not an anomaly-occurring portion and at the same time, an error history determination unit determines whether a recovered error occurred at the time of the past access to the storage apparatus other than that of the access destination. The anomaly-occurring portion determination unit determines whether a common transmission path is the anomaly-occurring portion based on the determination result of the error history determination unit.

20 Claims, 18 Drawing Sheets

FIG. 7

DEVICE MANAGEMENT TABLE
310

| Device name | | Status | Error score |
|---|---|---|---|
| Transmission path P0 | Backend EXP#0 | 1 | 0 |
| | DE EXP#0 | 1 | 80 |
| Transmission path P1 | Backend EXP#1 | 1 | 0 |
| | DE EXP#1 | 1 | 0 |
| Disk#0 | | 1 | 10 |
| Disk#1 | | 1 | 0 |
| Disk#2 | | 1 | 200 |
| ⋮ | | ⋮ | ⋮ |
| Disk#5 | | 1 | 0 |

FIG. 8

RAID MANAGEMENT TABLE 320

| RAID group number | RAID level | Used disk | Status | Logical volume information |
|---|---|---|---|---|
| RLU#00 | RAID5 | Disk#0 | 1 | LU#00 : ····<br>LU#01 : ····<br>⋮ |
|  |  | Disk#1 | 1 |  |
|  |  | Disk#2 | 1 |  |
|  |  | Disk#3 | 1 |  |
| RLU#01 | ⋮ | ⋮ | ⋮ | ⋮ |
| ⋮ | ⋮ | ⋮ | ⋮ | ⋮ |

FIG. 9

330  DISK BIT MAP

| Transmission path \ Disk | #0 | #1 | #2 | #3 | #4 | #5 |
|---|---|---|---|---|---|---|
| P0 | 1 | 1 | 1 | 0 | 0 | 0 |
| P1 | 0 | 0 | 0 | 0 | 0 | 0 |

FIG. 16

STORAGE SYSTEM AND METHOD FOR DETERMINING ANOMALY-OCCURRING PORTION

CROSS-REFERENCE TO RELATED APPLICATION

This application is based upon and claims the benefit of priority of the prior Japanese Patent Application No. 2011-072572, filed on Mar. 29, 2011, the entire contents of which are incorporated herein by reference.

FIELD

The embodiments discussed herein relate to a storage system and a method for determining an anomaly-occurring portion.

BACKGROUND

As a storage controller connected to a storage apparatus, such as an HDD (Hard Disk Drive), there is a controller that adds a score to an error score table each time an error occurs upon access to a storage apparatus and disconnects the storage apparatus to prevent it from being used when the score in the error score table reaches a fixed value. For example, there is a storage controller that includes a function to, when an error occurred in access processing to a disk array device, add a score to a box within an error score table corresponding to an HDD in which anomaly has occurred, and store information indicative of the occurrence of anomaly in the HDD in another error table, and determines a score to be added to the error score table based on the information stored in the another error table at the time of the occurrence of the error. Further, there is also a storage controller that adds a score in accordance with the occurrence of anomaly in the error score table not only for a storage apparatus to be accessed but also for a transmission path to the storage apparatus.

On the other hand, some peripheral devices, such as a storage apparatus, include a function to determine, when an error occurred upon access from an information processor, whether the error is caused by the peripheral device or a connection path. For example, the following literature describes such conventional devices and method for error retry.

Japanese Laid-Open Patent Publication No. 2009-205316
Japanese Laid-Open Patent Publication No. 2000-132413

As an error that occurs when a storage controller accesses a storage apparatus, there is such an error without reproducibility that occurs in the access processing for the first time but does not occur when retrying the access processing. When such an error without reproducibility occurs, in many cases, it is possible to continue the processing to access the storage apparatus for the time being even if the error is caused by the storage apparatus of the access destination or the transmission path used for the access.

For example, with a storage system in which data is made redundant by being recorded in different storage apparatuses, there is a case where it is desired to continue the operation of the system using a normal storage apparatus in a state where data to be accessed has no longer redundancy because of the failure of part of the storage apparatuses. When an error without reproducibility occurs in a state where data to be accessed has no redundancy, the possibility is great that it is possible to continue the operation for the time being without disconnecting the storage apparatus of the access destination.

Further, for example, with a storage system in which the transmission path connected to the storage apparatus is made redundant, there is a case where it is desired to continue the operation of the system using a normal transmission path in a state where the transmission path has no longer redundancy because of the failure of part of the transmission paths. When an error without reproducibility occurs in a state where a transmission path has no redundancy, the possibility is great that it is possible to continue the operation for the time being without disconnecting the transmission path used for access.

However, continuation of the operation of a system despite the occurrence of an error may make the determination criterion of an anomaly-occurring portion less stringent and as a result of that, there used to be such a problem that the determination precision of an anomaly-occurring portion may deteriorate.

SUMMARY

According to one aspect of the present embodiment, there is provided a storage system including a plurality of storage apparatuses and a controller that accesses each of the plurality of storage apparatuses through a common transmission path and at the same time, manages the plurality of storage apparatuses so that data to be recorded in the plurality of storage apparatuses is made redundant in the different storage apparatuses, wherein the controller performs a procedure including: determining whether data to be accessed has redundancy when an error occurred upon access to one of the plurality of storage apparatuses; and when determining that the data to be accessed has no redundancy, determining that the storage apparatus of the access destination is not the anomaly-occurring portion and at the same time, determining whether an error occurred at the time of a past access to the storage apparatus other than the storage apparatus of the access destination among the plurality of storage apparatuses and determining whether the common transmission path is the anomaly-occurring portion based on the determination result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of information to be registered in a device management table;

FIG. 8 illustrates an example of information to be registered in a RAID management table;

FIG. 9 illustrates an example of information to be registered in a disk bit map;

FIG. 16 is a flowchart (Part 1) illustrating an example of a processing procedure when an error occurs in a CM;

DESCRIPTION OF EMBODIMENTS

Embodiments will be described below in detail with reference to the drawings.

(First Embodiment)

Figure 1:
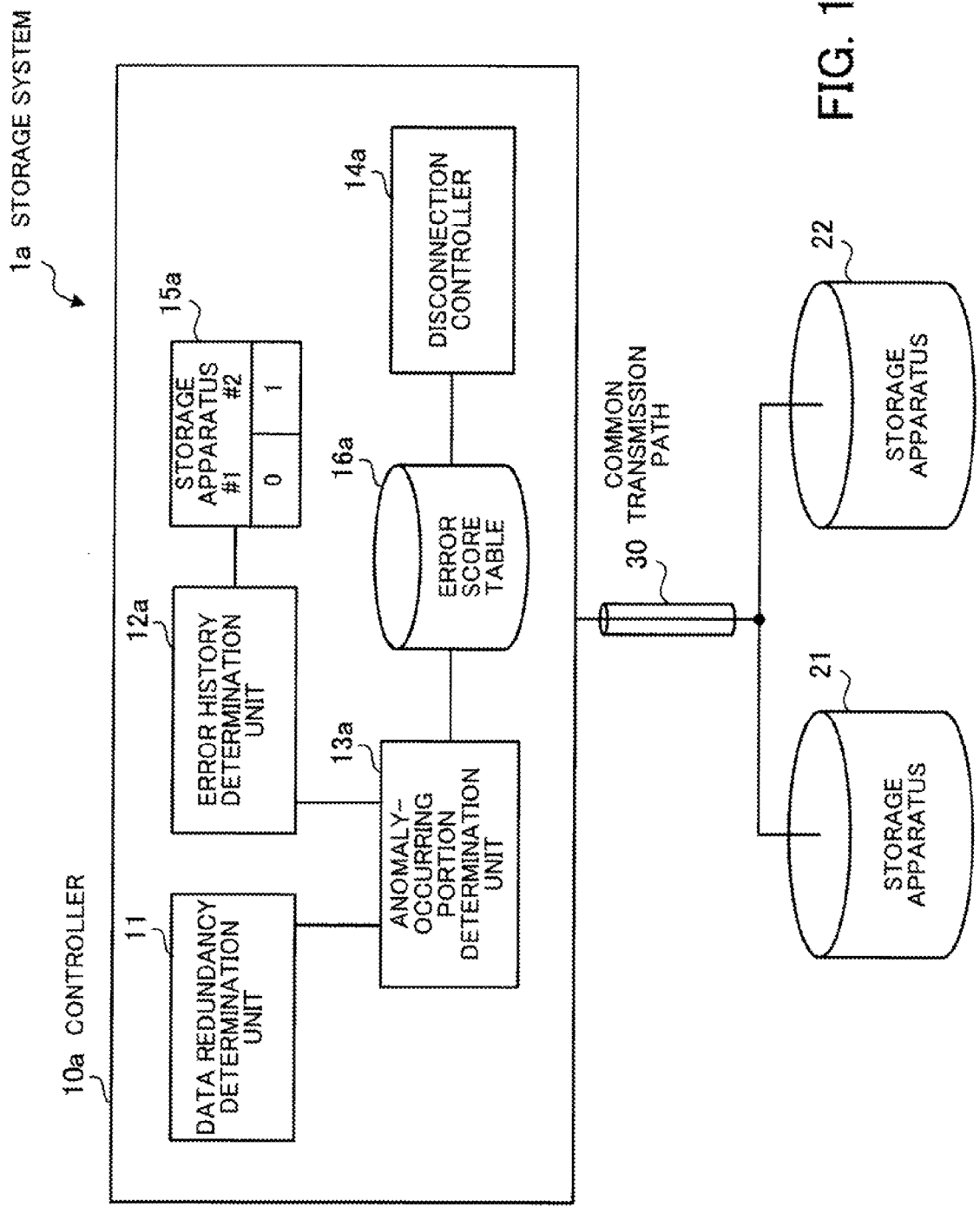
FIG. 1 illustrates a configuration example of a storage system according to a first embodiment.

FIG. 1 illustrates a configuration example of a storage system according to a first embodiment.

A storage system 1a illustrated in FIG. 1 includes a controller 10a and a plurality of storage apparatuses. In FIG. 1, two storage apparatuses 21 and 22 are illustrated as an example, but the number of storage apparatuses may be three or more. The controller 10a connects with the storage apparatuses 21 and 22 via a common transmission path 30 and is enabled to access the storage apparatuses 21 and 22 via the common transmission path 30. The common transmission path 30 constitutes part of a transmission path that connects the controller 10a and the storage apparatuses 21 and 22 and includes, for example, a relay that relays data transmitted and received between the controller 10a and the storage apparatuses 21 and 22.

Further, when recording data in the storage apparatuses 21 and 22, the controller 10a performs control so that the data is made redundant in the different storage apparatuses. For example, when recording data in the storage apparatus 21, the controller 10a records the same data also in the storage apparatus 22. Furthermore, when there are, for example, three or more storage apparatuses, the controller 10a may record record data and the parity based on the record data in different storage apparatuses respectively, according to any of redundant arrays of inexpensive disks (RAID) 4, 5 and 6.

The controller 10a includes a data redundancy determination unit 11, an error history determination unit 12a, and an anomaly-occurring portion determination unit 13a. The controller 10a may further include a disconnection controller 14a. Processing of the data redundancy determination unit 11, the error history determination unit 12a, the anomaly-occurring portion determination unit 13a, and the disconnection controller 14a is implemented when, for example, a CPU (Central Processing Unit) included in the controller 10a executes predetermined programs.

The data redundancy determination unit 11 determines whether data to be accessed has redundancy when an error occurred upon access to one of the storage apparatuses 21 and 22. The error referred to here is, for example, a "recovered error". The "recovered error" refers to an error without reproducibility that occurs in the access processing for the first time but does not occur when retrying the access processing, and therefore, the access processing succeeds. The wording "data to be accessed has redundancy" refers to a state where the data to be accessed itself is stored in different storage apparatuses or the data to be accessed and data (for example, parity) to be used to restore the data are stored in different storage apparatuses, respectively. In other words, the wording "data to be accesses has no redundancy" refers to a state where if the data to be accessed or data to be used to restore the data is lost because of a failure of the storage apparatus, the record data to be accessed is no longer restored.

The error history determination unit 12a determines whether a recovered error occurred at the time of the past access to the storage apparatus other than the storage apparatus of the access destination of the storage apparatuses 21 and 22 when a recovered error occurred. For example, the error history determination unit 12a refers to an error history table 15a and determines whether a recovered error occurred at the time of the past access to each of the storage apparatuses 21 and 22.

In the error history table 15a, an individual flag is registered, for example, in each storage apparatus. For example, in the error history table 15a in FIG. 1, storage apparatuses #1 and #2 correspond to the storage apparatuses 21 and 22, respectively, and "0" and "1" as flag values are registered for the storage apparatuses #1 and #2, respectively. Then, when a recovered error occurs, the flag within the error history table 15a corresponding to the storage apparatus of the access destination at the time of the occurrence of the recovered error is updated from the initial value "0" to "1" indicative of the occurrence of the recovered error. As another example, it may also be possible for the error history determination unit 12a to perform determination processing based on information about the recovered error history in which information indicative of the storage apparatus of the access destination at the time of the occurrence of the recovered error is registered.

The anomaly-occurring portion determination unit 13a determines an anomaly-occurring portion based on the determination result of the data redundancy determination unit 11 and the error history determination unit 12a when a recovered error occurred. For example, when the data redundancy determination unit 11 determines that the data to be accessed has no redundancy, the anomaly-occurring portion determination unit 13a determines that the storage apparatus of the access destination is not the anomaly-occurring portion and at the same time, determines whether the common transmission path 30 is the anomaly-occurring portion based on the determination result of the error history determination unit 12a.

For example, it may also be possible for the anomaly-occurring portion determination unit 13a to set the portion determined to be the portion where anomaly has occurred to a candidate to be disconnected from the controller 10a in the future. Here, to "disconnect" a storage apparatus or transmission path means that the controller 10a does not allow using the storage apparatus or transmission path. As an example of processing of setting a portion where anomaly is determined to have occurred to a candidate to be disconnected, there is processing of adding a score to an error score table 16a to be described later.

When a recovered error occurred upon access to data without redundancy, if it is determined that anomaly has occurred in the storage apparatus of the access destination and the storage apparatus is disconnected from the controller 10a, the data being accessed enters a state where restoration is no longer possible. In this state, it is normally necessary to stop the operation of the entire storage system 1a. However, a recovered error is relieved by retrying access processing, and therefore, even if a recovered error occurs because of trouble in the storage apparatus of the access destination, it is possible to continue the operation as is using the storage apparatus for the time being. When a recovered error occurred upon access to data without redundancy, if the anomaly-occurring portion determination unit 13a determines that the storage apparatus of the access destination is not the anomaly-occurring portion, it is made possible to continue the operation of the storage system 1a.

On the other hand, according to the processing of the error history determination unit 12a, when a recovered error occurred at the time of the past access to the storage apparatus other than the storage apparatus of the access destination, it is possible to infer that the possibility is great that the anomaly-occurring portion is not the storage apparatus of the current access destination but the common transmission path 30. Consequently, when a recovered error occurred upon access to data without redundancy, it is made possible for the anomaly-occurring portion determination unit 13a to accurately determine whether the common transmission path is the anomaly-occurring portion by referring to the determination result of the error history determination unit 12a. Due to this, the possibility is reduced that the common transmission path 30 is determined erroneously to be the anomaly-occurring portion despite that the cause of the recovered error is the storage apparatus of the access destination, and therefore, it is possible to prevent the common transmission path 30 from being disconnected unnecessarily.

That is, by the determination processing described above by the anomaly-occurring portion determination unit 13a, it is made possible to continue the use of the storage apparatus in which data without redundancy is stored as long as possible. At the same time, it is possible to reduce the probability of the occurrence of a state where the common transmission path 30 is disconnected unnecessarily because the anomaly-occurring portion is determined erroneously to be the common transmission path 30, and therefore, the determination precision of an anomaly-occurring portion is improved.

For example, it may also be possible for the anomaly-occurring portion determination unit 13a to register information about the portion where anomaly has occurred in the error score table 16a. In the error score table 16a, a score corresponding to the occurrence of an error is retained individually for each of the storage apparatuses 21 and 22 and the common transmission path 30. Further, the error score table 16a is referred to by the disconnection controller 14a. The disconnection controller 14a determines that a failure has occurred in the storage apparatus or the common transmission path 30 whose score in the error score table 16a has reached a predetermined threshold value and disconnects the storage apparatus or the common transmission path 30.

For example, when the data redundancy determination unit 11 determines that the data to be accessed has no redundancy and if the error history determination unit 12a determines that a recovered error occurred in the past, the anomaly-occurring portion determination unit 13a adds a score to the common transmission path 30 in the error score table 16a without adding a score to the storage apparatus to be accessed. On the other hand, when the data redundancy determination unit 11 determines that the data to be accessed has no redundancy and if the error history determination unit 12a determines that a recovered error did not occur in the past, the anomaly-occurring portion determination unit 13a does not add a score to the storage apparatus to be accessed or to the common transmission path 30 in the error score table 16a.

Due to such processing of the anomaly-occurring portion determination unit 13a, a state is made harder to occur where the score of the common transmission path 30 increases in the error score table 16a without an increase in score of the storage apparatus of the access destination despite that the cause of the recovered error is the storage apparatus of the access destination. As a result of that, it is possible to reduce the probability of the occurrence of a state where the common transmission path 30 in which no failure has occurred is disconnected erroneously.

(Second Embodiment)

Figure 2:
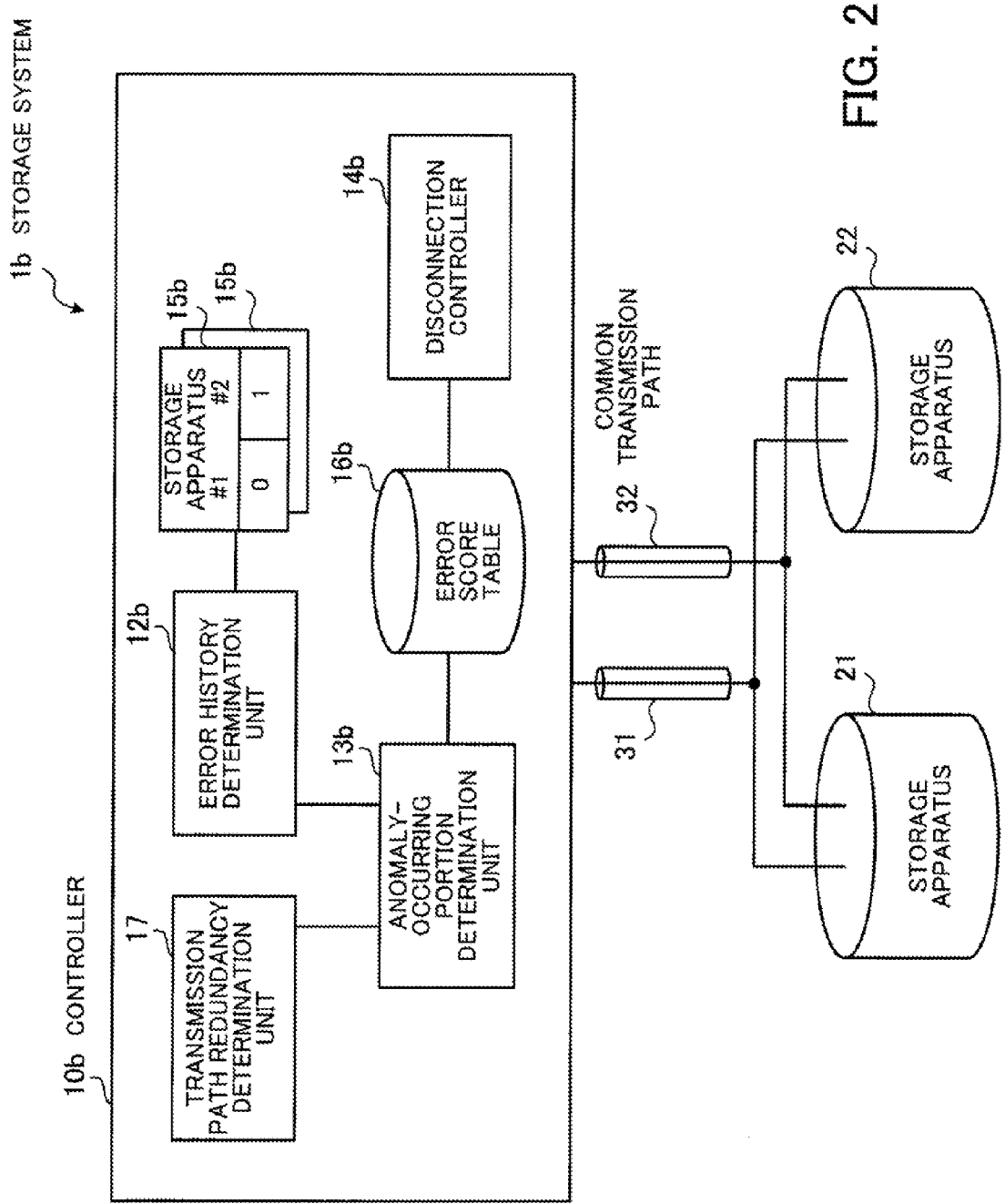
FIG. 2 illustrates a configuration example of a storage system according to a second embodiment.

FIG. 2 illustrates a configuration example of a storage system according to a second embodiment. In FIG. 2, the same components as those in FIG. 1 are illustrated with the same symbols attached.

A storage system 1b illustrated in FIG. 2 includes a controller 10b and a plurality of storage apparatuses. In FIG. 2, the two storage apparatuses 21 and 22 are illustrated as an example, but the number of storage apparatuses may be three or more. The controller 10b is enabled to access the storage apparatuses 21 and 22 through a plurality of common transmission paths. In FIG. 2, as an example, two common transmission paths 31 and 32 are illustrated, but the number of common transmission paths may be three or more.

The controller 10b includes a transmission path redundancy determination unit 17, an error history determination unit 12b, and an anomaly-occurring portion determination unit 13b. The transmission path redundancy determination unit 17 and the controller 10b may further include a disconnection controller 14b. Processing of the error history determination unit 12b, the anomaly-occurring portion determination unit 13b, and the disconnection controller 14b is implemented when, for example, a CPU (Central Processing Unit) included in the controller 10a executes predetermined programs.

The transmission path redundancy determination unit 17 determines whether the common transmission path between the storage apparatuses 21 and 22, and the controller 10b has redundancy when an error occurred upon access to one of the storage apparatuses 21 and 22. The error referred to here is, for example, the "recovered error" described previously. The wording "the common transmission path has redundancy" refers to that the controller 10b and the storage apparatuses 21 and 22 are connected through a plurality of common transmission paths. In the example of FIG. 2, when one of the common transmission paths 31 and 32 is disconnected from the controller 10b, the common transmission path is said to be in the state without redundancy.

The error history determination unit 12b determines whether a recovered error occurred at the time of the past access to the storage apparatus other than the storage of the access destination of the storage apparatuses 21 and 22 through the same common transmission path when a recovered error occurred. For example, the error history determination unit 12b refers to an error history table 15b and determines whether a recovered error occurred at the time of the past access to the storage apparatuses 21 and 22 through the same common transmission path.

In the error history table 15b, a flag indicating whether a recovered error has occurred is registered for each storage apparatus as in the error history table 15a of FIG. 1. However, the error history table 15b is provided individually for each of the common transmission paths 31 and 32 between the storage apparatuses 21 and 22, and the controller 10b. When a recovered error occurs, the error history table 15b corresponding to the common transmission path used for access is selected. Then, the flag within the selected error history table 15b is updated from the initial value "0" to "1" indicating that a recovered error has occurred.

As another example, it may also be possible for the error history determination unit 12b to perform determination processing based on history information about the recovered error in which information indicative of the storage apparatus of the access destination at the time of the occurrence of the recovered error and information indicative of the common transmission path used at the time of occurrence of the recovered error are registered.

The anomaly-occurring portion determination unit 13b determines an anomaly-occurring portion based on the determination result of the transmission path redundancy determination unit 17 and the error history determination unit 12b when a recovered error occurred. For example, when the transmission path redundancy determination unit 17 determines that the common transmission path has no redundancy, the anomaly-occurring portion determination unit 13b determines that the common transmission path used for access is not the anomaly-occurring portion and at the same time, determines whether the storage apparatus of the access destination is the anomaly-occurring portion based on the determination result of the error history determination unit 12b.

For example, it may also be possible for the anomaly-occurring portion determination unit 13b to set the portion determined to be the portion where anomaly has occurred to a candidate to be disconnected from the controller 10b in the future as in the case of the anomaly-occurring portion determination unit 13a of FIG. 1. As an example of processing of setting a portion where anomaly is determined to have occurred to a candidate to be disconnected, there is processing of adding a score to an error score table 16b to be described later.

When a recovered error occurred in a state where the common transmission path has no redundancy, if it is determined that anomaly has occurred in the common transmission path used for the access and the common transmission path is disconnected from the controller 10b, a state is brought about where it is not possible to access both the storage apparatus 21 and the storage apparatus 22 and it is not possible to continue the operation of the entire storage system 1b. However, as described previously, a recovered error is relieved by retrying access processing, and therefore, even if a recovered error occurs because of trouble of the common transmission path used for the access, it is possible to continue the operation using the common transmission path for the time being. When a recovered error occurred in a state where the common transmission path has no redundancy, if the anomaly-occurring portion determination unit 13b determines that the common transmission path used for the access is not the anomaly-occurring portion, it is made possible to continue the operation of the storage system 1b.

On the other hand, according to the processing of the error history determination unit 12b, when a recovered error did not occur at the time of the past access to the storage apparatus other than the storage apparatus of the access destination through the same common transmission path, it is possible to infer that the possibility is great that the anomaly-occurring portion is not the common transmission path used for the access but the storage apparatus of the access destination. Consequently, when a recovered error occurred in the state where the common transmission path has no redundancy, it is made possible for the anomaly-occurring portion determination unit 13b to accurately determine whether the common transmission path used for the access is the anomaly-occurring portion by referring to the determination result of the error history determination unit 12b. Due to this, the possibility is reduced that the storage apparatus of the access destination is determined erroneously to be the anomaly-occurring portion despite that the cause of the recovered error is the common transmission path used for the access, and therefore, it is possible to prevent the storage apparatus of the access destination from being disconnected unnecessarily from the controller 10b.

That is, by the determination processing described above by the anomaly-occurring portion determination unit 13b, it is made possible to continue the use of the common transmission path in the state without redundancy as long as possible. At the same time, it is possible to reduce the probability of the occurrence of a state where the storage apparatus of the access destination is disconnected unnecessarily because the anomaly-occurring portion is determined erroneously to be the storage apparatus of the access destination, and therefore, the determination precision of an anomaly-occurring portion is improved.

For example, it may also be possible for the anomaly-occurring portion determination unit 13b to register information about the portion where anomaly has occurred in the error score table 16b. In the error score table 16b, a score corresponding to the occurrence of an error is retained individually for each of the storage apparatuses 21 and 22 and for each of the common transmission paths 31 and 32. Further, the error score table 16b is referred to by the disconnection controller 14b. The disconnection controller 14b determines that a failure has occurred in the storage apparatus or the common transmission path whose score in the error score table 16b has reached a predetermined threshold value and disconnects the storage apparatus or the common transmission path from the controller 10b.

For example, when the transmission path redundancy determination unit 17 determines that the common transmission path used for the access has no redundancy and if the error history determination unit 12b determines that a recovered error did not occur in the past, the anomaly-occurring portion determination unit 13b adds a score to the storage apparatus to be accessed in the error score table 16b without adding a score to the common transmission path used for the access. On the other hand, when the transmission path redundancy determination unit 17 determines that the common transmission path used for the access has no redundancy and if the error history determination unit 12b determines that a recovered error occurred in the past, the anomaly-occurring portion determination unit 13b does not add a score to the common transmission path used for the access or to the storage apparatus to be accessed in the error score table 16b.

Due to such processing of the anomaly-occurring portion determination unit 13b, a state is made harder to occur where the score of the storage apparatus of the access destination increases in the error score table 16b without an increase in score of the common transmission path used for the access despite that the cause of the recovered error is the common transmission path used for the access. As a result of that, it is possible to reduce the probability of the occurrence of a state where the storage apparatus in which no failure has occurred is disconnected erroneously.

Figure 3:
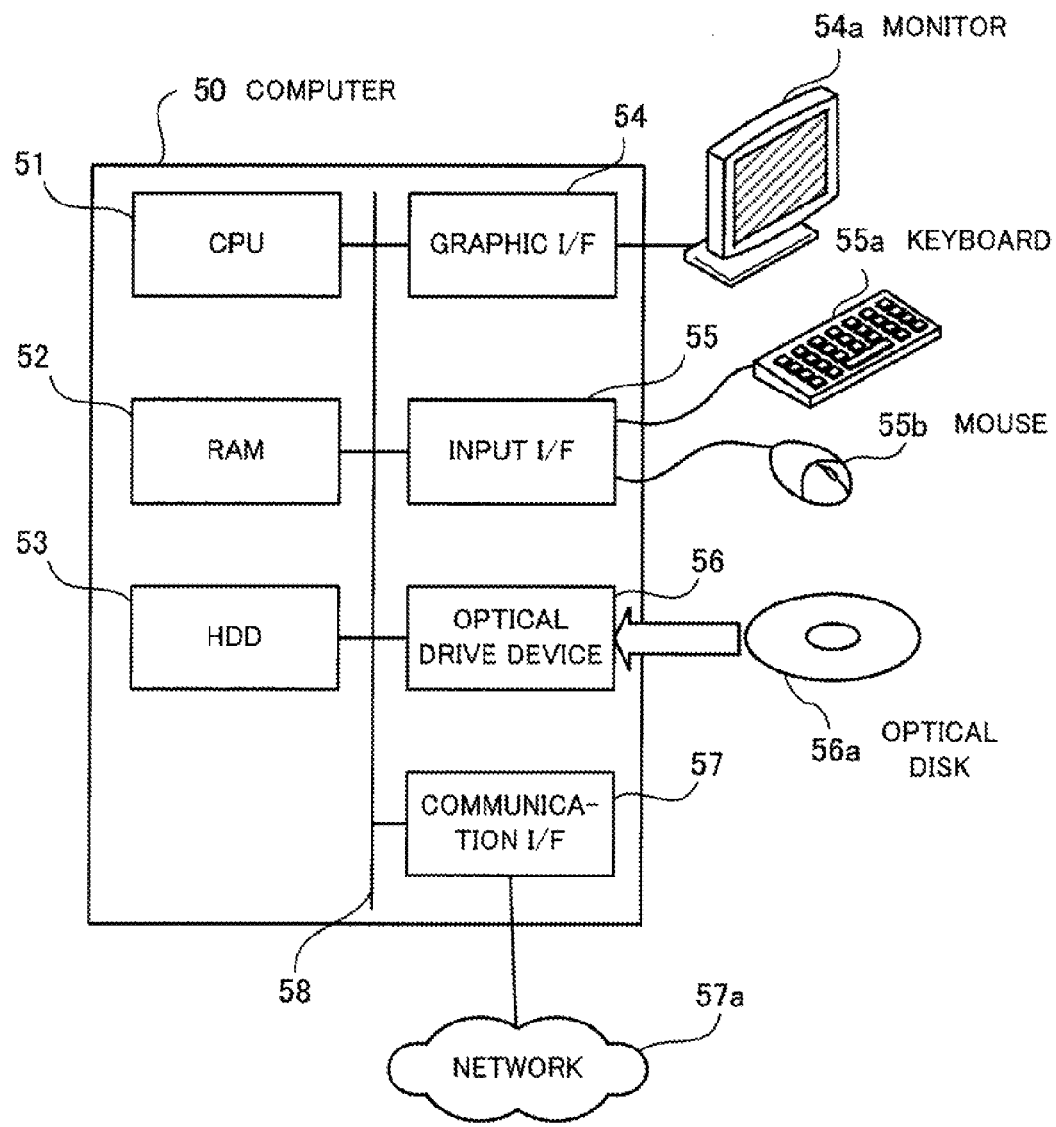
FIG. 3 illustrates a hardware configuration example of a computer.

The controller 10a illustrated in FIG. 1 and the controller 10b illustrated in FIG. 2 may be realized as such a computer, for example, as illustrated in FIG. 3 described below. FIG. 3 illustrates a hardware configuration example of a computer.

The whole of a computer 50 illustrated in FIG. 3 is controlled by a CPU 51. To the CPU 51, a RAM (Random Access Memory) 52 and a plurality of peripheral devices are connected via a bus 58.

The RAM 52 is used as a main storage apparatus of the computer 50. In the RAM 52, at least part of the operating system (OS) program and application programs that the CPU 51 is caused to execute are stored temporarily. Further, in the RAM 52, various pieces of data necessary for processing by the CPU 51 are stored.

As peripheral devices connected to the bus 58, mention is made of an HDD 53, a graphic interface (I/F) 54, an input interface 55, an optical drive device 56, and a communication interface 57.

The HDD 53 is used as a secondary storage apparatus of the computer 50. In the HDD 53, the OS program, application programs, and various pieces of data are stored. As a secondary storage apparatus, it is possible to use another type of nonvolatile storage apparatus, such as a solid state drive (SSD).

To the graphic interface 54, a monitor 54a is connected. The graphic interface 54 causes the monitor 54a to display various images, such as a guide image described previously, according to the command from the CPU 51.

To the input interface 55, for example, a keyboard 55a and a mouse 55b are connected. The input interface 55 transmits an output signal from the keyboard 55a and the mouse 55b to the CPU 51. The mouse 55b is an example of a pointing device and it is also possible to use another pointing device. Other pointing devices include a touch panel, tablet, touch pad, track ball, etc. The optical drive device 56 reads data recorded in an optical disk 56a using laser light etc. The optical disk 56a is a portable recording medium in which data is recorded so as to be read by reflection of light. The optical disk 56a includes a DVD (Digital Versatile Disk), DVD-RAM, CD-ROM (Compact Disk Read Only Memory), CD-R (Recordable), CD-RW (Rewritable), etc.

The communication interface 57 transmits and receives data to and from another device connected to a network 7a. The communication interface 57 connects with, for example, the storage apparatuses 21 and 22 illustrated in FIG. 1 and FIG. 2. As a device configuring part of the common transmission path 30 of FIG. 1 and part of common transmission paths 31 and 32 of FIG. 2, respectively, it is possible to apply a relay device, such as a hub on the network 7a.

[Third Embodiment]

Figure 4:
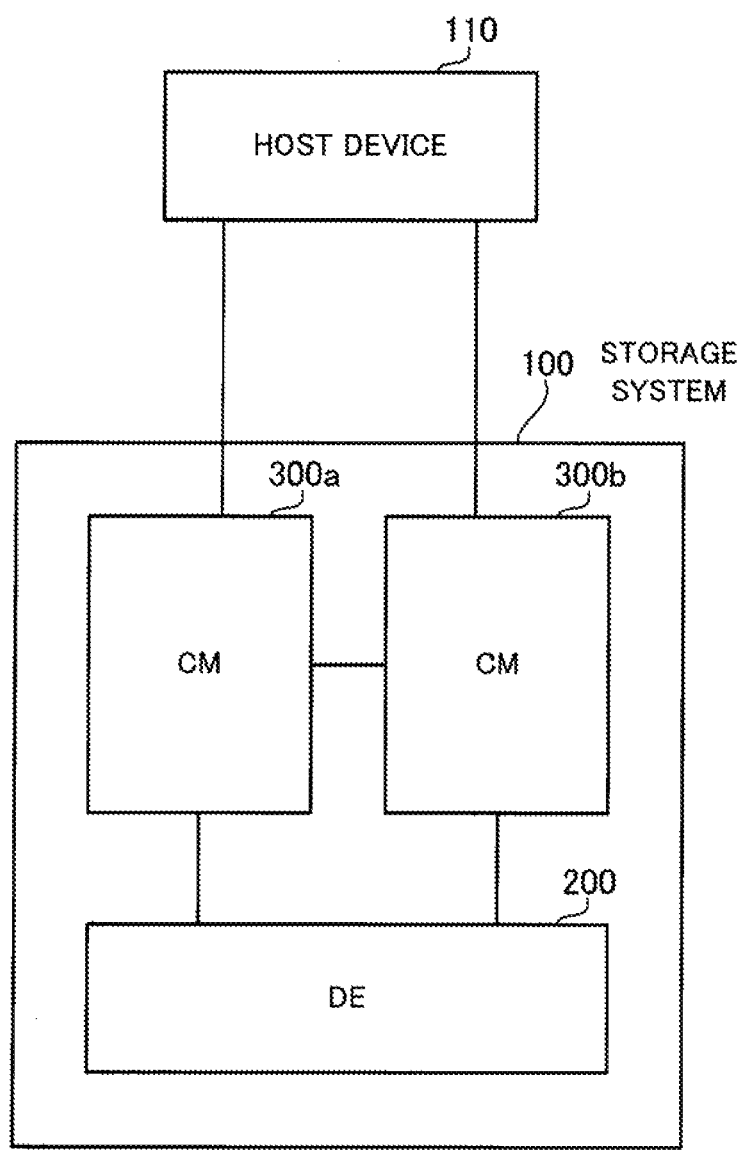
FIG. 4 illustrates a system configuration example of a storage system according to a third embodiment.

FIG. 4 illustrates a system configuration example of a storage system according to a third embodiment.

A storage system 100 illustrated in FIG. 4 includes a drive enclosure (DE) 200 and controller modules (CM) 300a and 300b. To the storage system 100, a host device 100 is connected.

The drive enclosure 200 includes a plurality of storage apparatuses the access to which from the controller modules 300a and 300b is to be controlled. The drive enclosure 200 includes an HDD as a storage apparatus. The drive enclosure 200 may be provided plural in number within the storage system 100. Further, the drive enclosure 200 may be provided in a case different from that in which the controller modules 300a and 300b are provided. As a storage apparatus to be provided in the drive enclosure 200, it is also possible to use another kind of nonvolatile storage apparatus, such as an SSD.

The controller modules 300a and 300b manage a physical storage region realized by a plurality of HDDs within the drive enclosure 200 by redundant arrays of inexpensive disks (RAID) and control access to the physical storage region. Further, the controller modules 300a and 300b set a logical volume in the physical storage region realized by a plurality of HDDs within the drive enclosure 200, receive an access request to the logical volume from the host device 110, and access the HDD within the drive enclosure 200 according to the access request.

The controller module may be provided three or more in number within the storage system 100. By the provision of a plurality of controller modules, the access control system to the drive enclosure 200 is made redundant and the reliability of access control processing is improved.

The host device 110 requests access to the logical volume provided by the controller modules 300a and 300b from the controller modules 300a and 300b. The host device 110 and the controller modules 300a and 300b are connected via, for example, a Fibre Channel (FC) cable.

Figure 5:
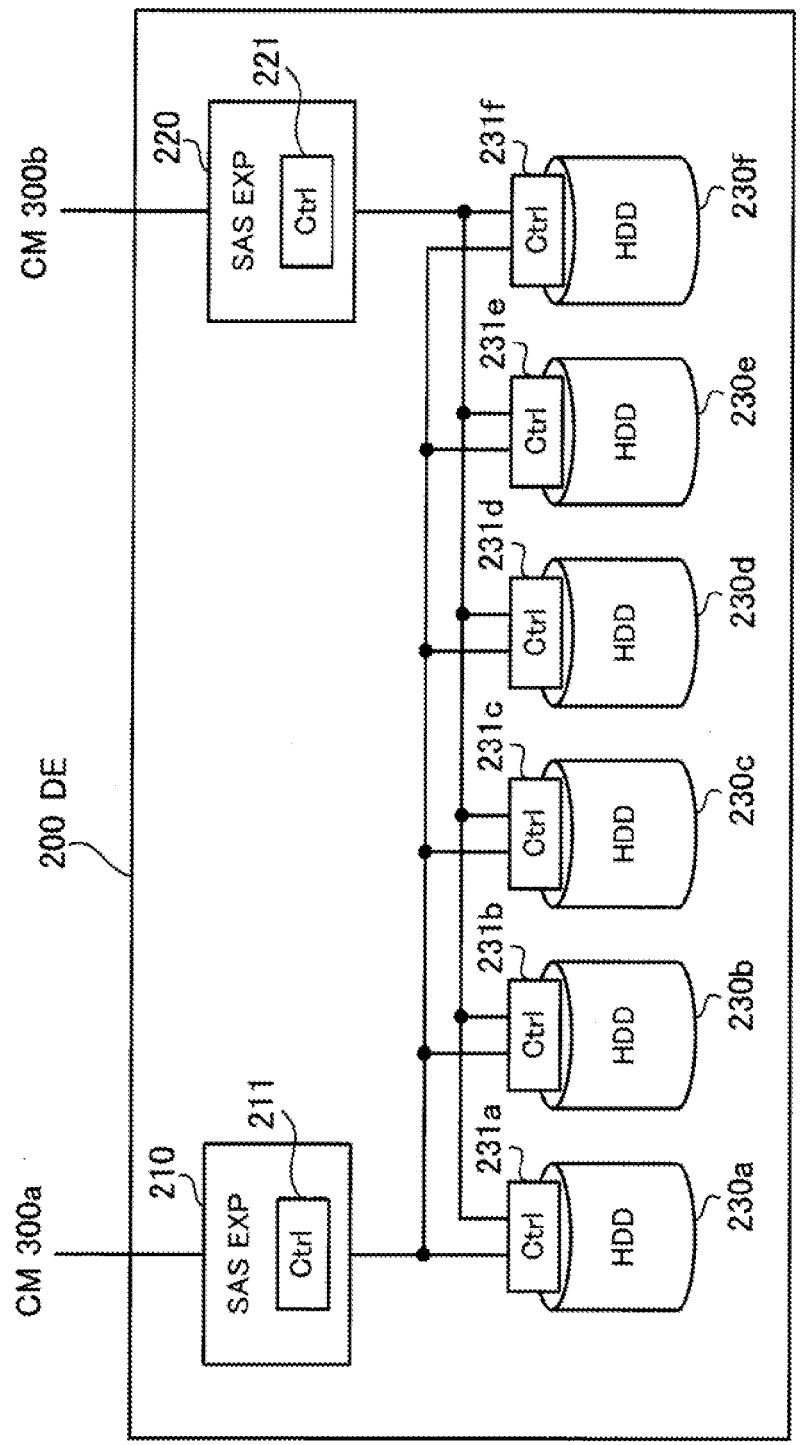
FIG. 5 illustrates a hardware configuration example of a DE.

FIG. 5 illustrates a hardware configuration example of a drive enclosure. The drive enclosure 200 includes serial attached small computer system interface (SAS) expanders 210 and 220 and a plurality of HDDs 230a to 230f.

The SAS expander 210 relays data between the controller module 300a and the HDDs 230a to 230f. The SAS expander 220 relays data between the controller module 300b and the HDDs 230a to 230f.

The SAS expanders 210 and 220 include controller circuits 211 and 221 that control data relay processing, respectively. The controller circuit 211 of the SAS expander 210 offers a function to transmit back sense information to the controller module 300a as, for example, a response to the access request to the HDD from the controller module 300a in addition to a function to control data relay processing. Sense information is information including a sense key (SK), additional sense code (ASC), and additional sense code qualifier (ASCQ) regulated by the SCSI standard. It is possible for the controller circuit 211 to notify the controller module 300a that an error has occurred caused by the SAS expander 210 itself by transmitting back the sense information. Further, the controller circuit 221 of the SAS expander 220 similarly offers the function to transmit back sense information as a response to the access request to the HDD from the controller module 300b in addition to the function to control data relay processing.

The HDDs 230a to 230f include controller circuits 231a to 231f, respectively, that perform SAS interface processing. The controller circuits 231a to 231f offer a function to transmit back the sense information to the access originator when having failed in correctly performing the operation according to the request from the access originator (controller module 300a or controller module 300b).

Figure 6:
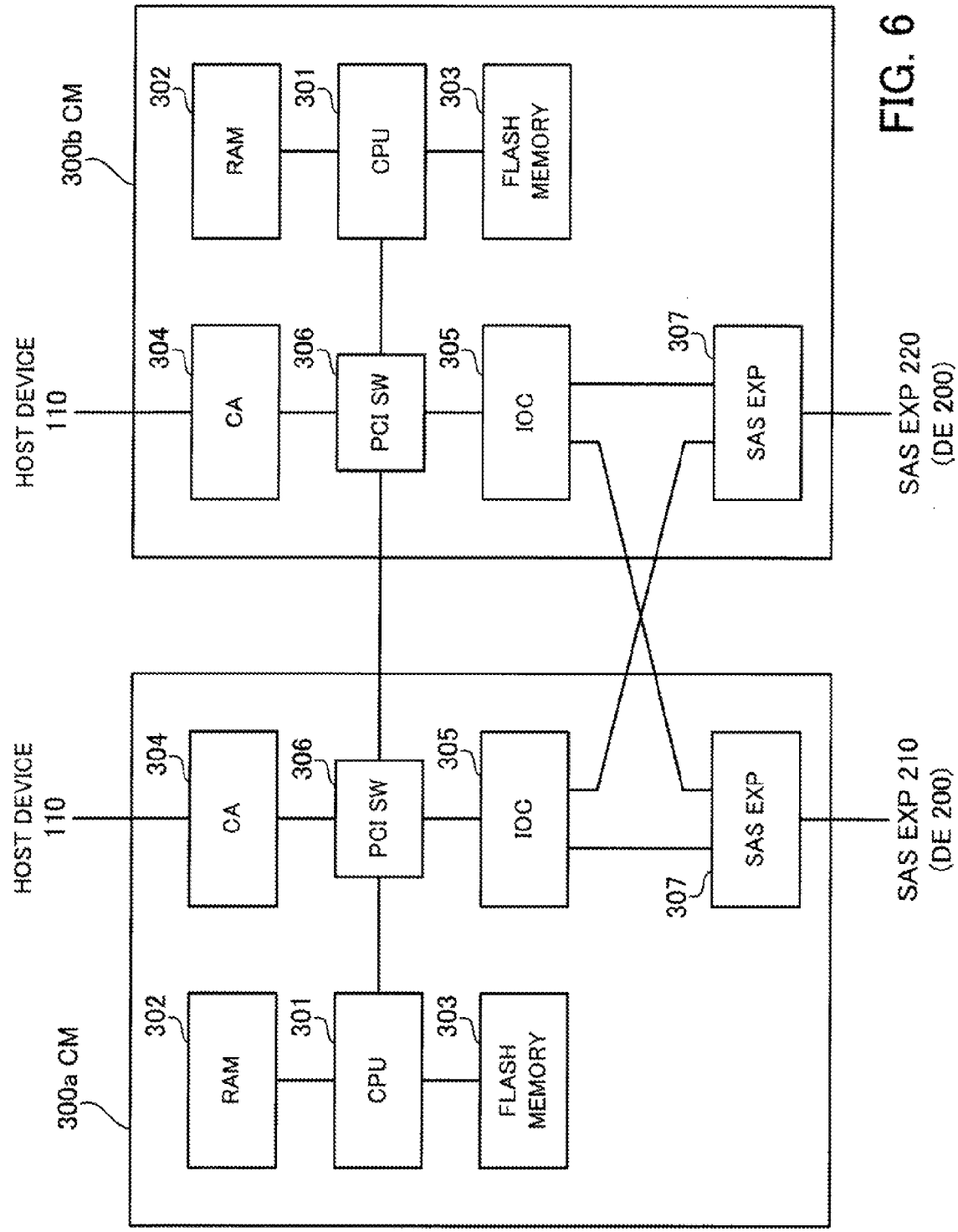
FIG. 6 illustrates a hardware configuration example of a CM.

FIG. 6 illustrates a hardware configuration example of a controller module. The controller modules 300a and 300b have the same hardware configuration, and therefore, in the following explanation, only the configuration of the controller module 300a is explained mainly.

The whole of the controller module 300a is controlled by a CPU 301. To the CPU 301, a RAM 302 and a plurality of peripheral devices are connected. The RAM 302 is used as a main storage apparatus of the controller module 300a and temporarily stores at least part of programs that the CPU 301 is caused to execute and various pieces of data necessary for processing by the programs.

To the CPU 301, as an example of the peripheral device, a flash memory 303, a channel adapter (CA) 304, and an In/Out controller (IOC) 305 are connected. The flash memory 303 is connected to the CPU 301 via a platform controller hub (PCH), not illustrated schematically. The channel adapter 304 and the IOC 305 are connected to the CPU 301 through, for example, a peripheral component interconnect (PCI) switch 306.

The flash memory 303 is used as a secondary storage apparatus of the controller module 300a and stores programs executed by the CPU 301, various pieces of data necessary to execute the programs, etc. As a secondary storage apparatus, it may also be possible to use another type of nonvolatile storage apparatus, such as an HDD.

The channel adapter 304 performs interface processing of data transmission and reception between the host device 110 and the controller module 300a.

The IOC 305 is a circuit that performs SAS interface processing. To the IOC 305 of the controller module 300a, both a SAS expander 307 provided in the controller module 300a and the SAS expander 307 provided in the controller module 300b are connected. The SAS expander 307 of the controller module 300a is connected to the SAS expander 210 of the drive enclosure 200. On the other hand, the SAS expander 307 of the controller module 300b is connected to the SAS expander 220 of the drive enclosure 200.

It is also possible for the IOC 305 of the controller module 300a to access the HDD within the drive enclosure 200 through the SAS expander 307 of the controller module 300b and the SAS expander 220 of the drive enclosure 200 as well as accessing the HDD within the drive enclosure 200 through the SAS expander 307 of the controller module 300a and the SAS expander 210 of the drive enclosure 200. That is, the path between the IOC 305 of the controller module 300a and each HDD of the drive enclosure 200 is made redundant by the path that passes through the SAS expander 307 of the controller module 300a and the SAS expander 210 of the drive enclosure 200 and the path that passes through the SAS expander 307 of the controller module 300b and the SAS expander 220 of the drive enclosure 200. In this manner, by making redundant the transmission path that connects the controller module 300a and the drive enclosure 200, the reliability of access processing from the controller module 300a to each HDD of the drive enclosure 200 is improved.

Similarly in the controller module 300b, the transmission path between the IOC 305 of the controller module 300b and each HDD of the drive enclosure 200 is made redundant by the path that passes through the SAS expander 307 of the controller module 300b and the SAS expander 220 of the drive enclosure 200 (hereinafter, referred to as a "transmission path P0") and the path that passes through the SAS expander 307 of the controller module 300a and the SAS expander 210 of the drive enclosure 200 (hereinafter, referred to as a "transmission path P1"). In this manner, by making redundant the transmission path that connects the controller module 300b and the drive enclosure 200, the reliability of access processing from the controller module 300b to each HDD of the drive enclosure 200 is improved.

The PCI switch 306 of the controller module 300a is connected with the PCI switch 306 of the other controller module 300b. It is made possible for the CPU 301 of the controller module 300a and the CPU 301 of the controller module 300b to transmit and receive data therebetween through a communication path that connects the PCI switch 306 of the controller module 300a and the PCI switch 306 of the controller module 300b.

Next, the processing performed by the controller modules 300a and 300b is explained. It is possible for both the controller modules 300a and 300b to perform the same processing, and therefore, in the following explanation, only the controller module 300a is explained as a representative.

First, information retained by the controller module 300a is explained. In the flash memory 303 of the controller module 300a, a device management table, a RAID management table, and a disk bit map are stored.

FIG. 7 illustrates an example of information to be registered in a device management table.

A device management table 310 is a table that retains information indicative of the state of the device on the transmission path to the drive enclosure 200 and the state of each HDD within the drive enclosure 200. In the device management table 310, "Status" and "Error score" are registered in association with "Device name" for identifying a device.

Devices registered in "Device name" include the SAS expander on the transmission path to the drive closure 200. For example, "Backend EXP #0", "DE EXP #0", "Backend EXP #1", and "DE EXP #1" in FIG. 9 refer to the SAS expander 307 of the controller module 300a, the SAS expander 210 of the drive enclosure 200, the SAS expander 307 of the controller module 300b, and the SAS expander 220 of the drive enclosure 200, respectively.

As described previously, the controller module 300a and the drive enclosure 200 are connected by the transmission path P0 passing through the SAS expander 307 of the controller module 300b and the SAS expander 220 of drive enclosure 200 and the transmission path P1 passing through the SAS expander 307 of the controller module 300a and the SAS expander 210 of the drive enclosure 200. In the device management table 310, "Device name" of the SAS expander on the transmission path is registered classified into the transmission path P0 and the transmission path P1.

Devices to be registered in "Device name" include the HDD provided in the drive enclosure 200. For example, "Disk #0" to "Disk #5" in FIG. 7 refer to the HDDs 230a to 230f within the drive enclosure 200, respectively.

"Status" is flag information indicating whether or not the corresponding device is in an available state. When the corresponding device is in the available state, "Status" is set to "1" and when the corresponding device is in an unavailable state, "Status" is set to "0". The controller module 300a disconnects the device corresponding to this "Status" from the controller module 300a when the value of "Status" is updated from "1" to "0".

"Error score" is a score to be added in accordance with the number of times an error occurred in the corresponding device. The initial value of "Error score" is "0". Further, as will be described later, when "Error score" reaches a predetermined threshold value (for example, "255"), the controller module 300a disconnects the device corresponding to this "Error score" from the controller module 300a.

It may also be possible for the controller module 300a and the controller module 300b to hold the device management table 310 in which, for example, each individual piece of information is registered. Alternatively, it may also be possible to synchronize the device management table 310 held by the controller module 300a with the device management table 310 held by the controller module 300b.

FIG. 8 illustrates an example of information to be registered in a RAID management table.

A RAID management table 320 is a table that retains information about RAID. In the RAID management table 320, "RAID level", "Used disk", "Status", and "Logical volume information" are registered in association with "RAID group number" for identifying a RAID group.

In "RAID level", a RAID level set to a RAID group is registered.

In "Used disk", information for identifying an HDD used in the RAID group of the HDDs within the drive enclosure 200 is registered. In "Used disk", normally, a plurality of HDDs is registered for one RAID group.

"Status" is a flag indicative of the state of the HDD indicated by "Used disk". The value registered in "Status" is the same as that in "Status" associated with the same HDD in the device management table 310.

In "Logical volume information", information about the logical volume set for the RAID group is registered. Information about the logical volume includes, for example, the number of the logical volume that is set, positional information of the physical region on the HDD used as the logical volume, etc.

FIG. 9 illustrates an example of information to be registered in a disk bit map.

A disk bit map 330 retains information about whether or not a recovered error occurred, for which it is not possible to identify the anomaly-occurring portion based on the response to the access, at the time of the past access processing from the controller module 300a for each HDD of the access destination and for each transmission path used for the access. In the following, an error for which it is not possible to identify the anomaly-occurring portion based on the response to the access is called an "undoubted-portion-unknown error".

The disk bit map 330 includes a bit for each combination of each HDD within the drive enclosure 200 and each of the transmission paths P0 and P1 described previously. The bit value "0" indicates that no undoubted-portion-unknown recovered error occurred in the past and the bit value "1" indicates that an undoubted-portion-unknown recovered error occurred in the past. For example, when the bit corresponding to "Disk #0" and "Transmission path P0" is "1" in FIG. 9, this indicates that an undoubted-portion-unknown recovered error occurred when the HDD corresponding to "Disk #0" was accessed through the transmission path P0.

It may also be possible for the controller module 300a to automatically return the value of each bit on the disk bit map 330 to "0" when a fixed period of time elapses after updating the value from "0" to "1". In this case, each bit of the disk bit map 330 indicates whether or not an undoubted-portion-unknown recovered error occurred in a fixed period of time in the past.

It may also be possible for the controller module 300a and the controller module 300b to hold the disk bit map 330 in which, for example, each individual value is registered. Alternatively, it may also be possible to synchronize the disk bit map 330 held by the controller module 300a with the disk bit map 330 held by the controller module 300b.

Figure 10:
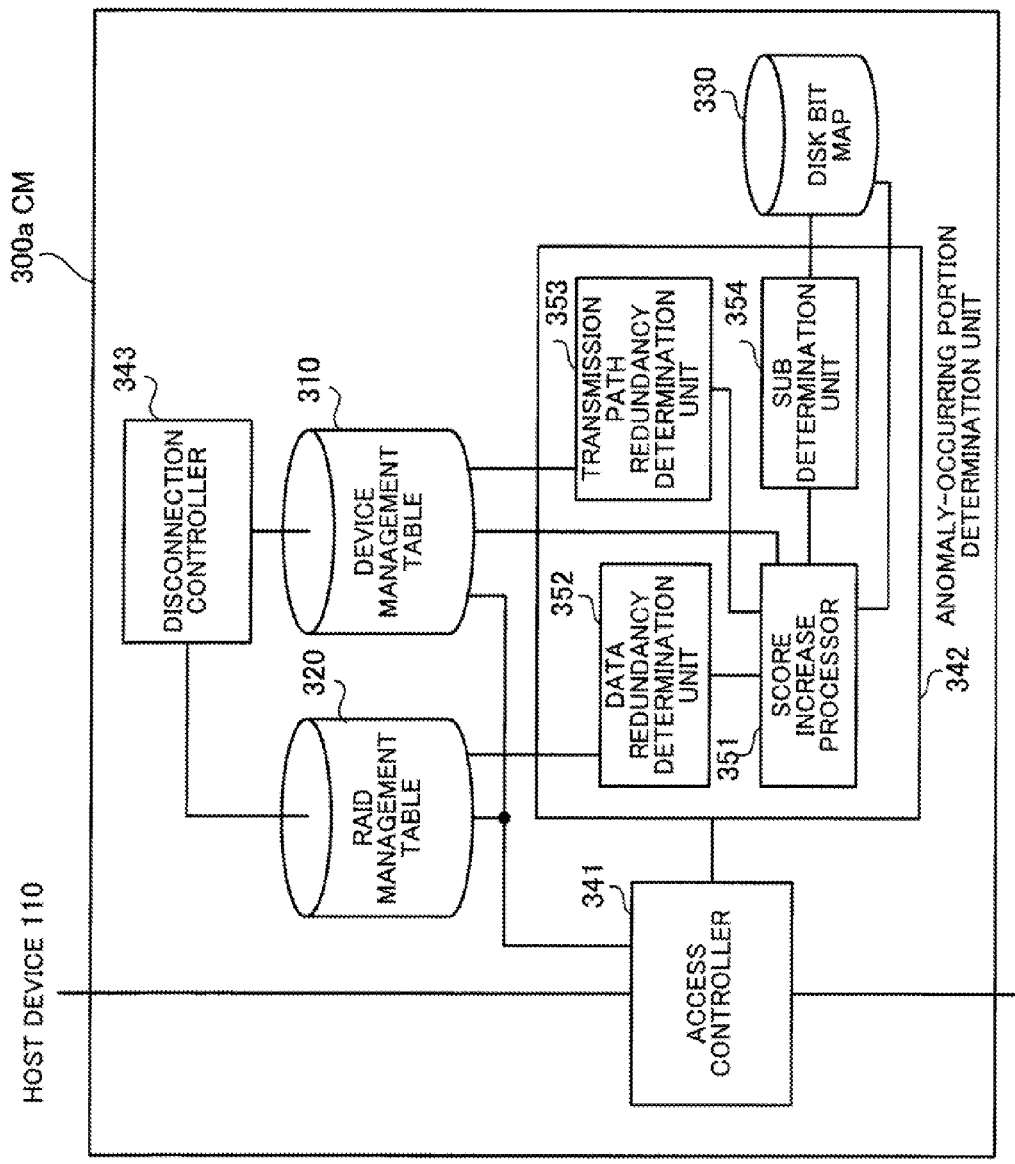
FIG. 10 is a block diagram illustrating a processing function that a CM offers.

Next, FIG. 10 is a block diagram illustrating a processing function that the controller module offers.

The controller module 300a includes an access controller 341, an anomaly-occurring portion determination unit 342, and a disconnection controller 343. Processing of the access controller 341, the anomaly-occurring portion determination unit 342, and the disconnection controller 343 is implemented when, for example, the CPU 301 of the CM 300a executes predetermined programs.

The access controller 341 accesses an HDD within the drive enclosure 200 in response to a request from the host device 110. The access controller 341 receives an access request for data included in the logical volume set in the RAID management table 320 from the host device 110 and accesses the data to which access is requested based on information registered in "Logical volume information" of the RAID management table 320.

Further, the access controller 341 manages data to be registered in the HDD within the drive enclosure 200 based on information of the RAID management table 320. The access controller 341 controls access to the HDD based on "Status" within the RAID management table 320 upon receipt of a request to access data.

For example, data read processing when one of RAIDs 4 and 5 is set in "RAID level" is performed as follows. When "Status" of all the HDDs indicated by "Used disk" associated with the same RAID group is "1", the access controller 341 reads data from any of the HDDs indicated by "Used disk". On the other hand, when "Status" of one of the HDDs indicated by "Used disk" associated with the same RAID group is "0", the access controller 341 performs any of the following read processing. The access controller 341 reads data from any of the HDDs the "Status" of which is "1" of the HDDs indicated by "Used disk". Alternatively, the access controller 341 reads data and parity from all the HDDs the "Status" of which is "1" of the HDDs indicated by "Used disk" and restores data to be read based on the data and parity that are read.

Further, the access controller 341 determines which of the transmission paths P0 and P1 to use to access the HDD according to predetermined rules. For example, the access controller 341 alternately selects the transmission paths P0 and P1 so that the communication load in the respective transmission paths P0 and P1 is even. However, when one of the transmission paths P0 and P1 is in the unavailable state based on "Status" about the SAS expander registered in the device management table 310, the access controller 341 selects the other transmission path and accesses the HDD.

Further, when an error occurred upon access to the HDD, the access controller 341 retries the same access processing. Furthermore, the access controller 341 notifies the anomaly-occurring portion determination unit 342 that an error has occurred whether the retried access processing is successful or not. Still furthermore, when receiving the sense information indicative of the contents of the error from the HDD of the access destination or the SAS expander on the access path, the access controller 341 notifies the received sense information to the anomaly-occurring portion determination unit 342.

When an error occurred in the access processing by the access controller 341, the anomaly-occurring portion determination unit 342 determines an anomaly-occurring portion and increases the value of "Error score" within the device management table 310 corresponding to the device determined to be the anomaly-occurring portion. The anomaly-occurring portion determination unit 342 includes a score increase processor 351, a data redundancy determination unit 352, a transmission path redundancy determination unit 353, and a sub determination unit 354 that offer the processing functions to implement such determination processing.

The score increase processor 351 determines an anomaly-occurring portion based on the sense information notified from the access controller 341 and each determination result of the data redundancy determination unit 352, the transmission path redundancy determination unit 353, and the sub determination unit 354. The score increase processor 351 increases the value of "Error score" within the device management table 310 corresponding to the device determined to be the portion where anomaly has occurred. Further, when an undoubted-portion-unknown recovered error occurred, the score increase processor 351 sets "1" to the bit corresponding to the HDD of the access destination and the transmission path used at the time of access of the bits in the disk bit map 330.

The data redundancy determination unit 352 determines whether the data to be accessed at the time of the occurrence of the error has redundancy based on the RAID management table 320. The wording "data has redundancy" refers to a state where it is possible to restore the data even if any one of the plurality of HDDs configuring the physical region of the RAID group is unavailable in the RAID group in which the logical volume including the data to be accessed is set. For example, the data redundancy determination unit 352 determines that the data has no redundancy if "Status" of any one of the plurality of HDDs associated with the RAID group to which any of the RAIDs 1, 4, 5 is set in "RAID level" is "0" in the RAID management table 320.

The transmission path redundancy determination unit 353 determines whether the transmission path to the drive enclosure 200 has redundancy when an error occurred based on the device management table 310. The wording "the transmission path has redundancy" refers to a state where both the transmission paths P0 and P1 to the drive enclosure 200 are available. The transmission path redundancy determination unit 353 determines that the transmission path has no redundancy if "Status" of any one of the devices (the SAS expander 307 of the controller module 300a and the SAS expander 210 of the drive enclosure 200) on the transmission path P0 and the devices (the SAS expander 307 of the controller module 300b and the SAS expander 220 of the drive enclosure 200) on the transmission path P1 is "0" in the device management table 310.

The sub determination unit 354 determines an anomaly-occurring portion based on the disk bit map 330 when an undoubted-portion-unknown recovered error occurred. The sub determination unit 354 refers to a bit group corresponding to the transmission path used at the time of the occurrence of the error in the disk bit map 330 and determines that anomaly has occurred in the device on the transmission path when "1" is registered to any one of the bits corresponding to the HDDs other than the HDD of the access destination at the time of the occurrence of the error. On the other hand, the sub determination unit 354 determines that anomaly has occurred in the HDD of the access destination when all the bits are "0", which correspond to the HDDs other than the HDD of the access destination at the time of the occurrence the error of the above-mentioned bit group.

The disconnection controller 343 monitors the value of "Error score" within the device management table 310 and determines whether the corresponding device has failed based on the value of "Error score". The disconnection controller 343 determines that the device the value of "Error score" of which has reached a predetermined threshold value is defective and disconnects the device from the controller module 300a by updating "Status" corresponding to the device from "1" to "0". The disconnection controller 343 also updates "Status" within the RAID management table 320 associated with the same device in the same manner by which the device management table 310 is updated when updating "Status" of the device management table 310.

Errors that occur during the access processing by the access controller 341 include an error by which it is possible to identify the device where anomaly that causes the error has occurred based on the response to the access and an "undoubted-portion-unknown error" by which it is not possible to identify the device. The former error is classified into an error caused by the anomaly the anomaly-occurring portion of which is the HDD of the access destination and an error caused by the anomaly the anomaly-occurring portion of which is the device (SAS expander) on the transmission path.

It is possible for the anomaly-occurring portion determination unit 342 to detect that anomaly has occurred in the HDD of the access destination based on, for example, the sense information sent back to the access controller 341 from the HDD. Examples of error caused by anomaly of the HDD include a "Not Ready" error indicating that response is not ready yet in the HDD etc. Examples of the "Not Ready" error include an error in which "SK/ASC/ASCQ" in the sense information becomes "02h/04h/01h" ("h" indicates the hexadecimal notation).

Further, it is possible for the anomaly-occurring portion determination unit 342 to detect that anomaly has occurred in the SAS expander on the transmission path used for access based on, for example, the sense information sent back to the access controller 341 from the SAS expander on the transmission path. When the sense information is sent back from the SAS expander, it is possible for the anomaly-occurring portion determination unit 342 to determine that anomaly has occurred in the SAS expander from which the sense information is sent back. Further, it is possible for the anomaly-occurring portion determination unit 342 to determine that anomaly has occurred in the nearest SAS expander on the transmission path (for example, the SAS expander 307 of the controller module 300a on the transmission path P0) when no response to the access by the access controller 341 is acquired for a fixed period of time.

There is also an error by which it is not possible to determine whether the anomaly-occurring portion is in the HDD or in the device on the transmission path from the sense information sent back to the access controller 341 from the HDD and such an error forms an undoubted-position-unknown error. Examples of undoubted-position-unknown error include a "Data Over Run" error indicating that the HDD has received data in the amount exceeding the expected amount etc. When the "Data Over Run" error occurred, "ASC/ASCQ" in the sense information becomes "0Dh/05h".

Next, determination and score increase processing by the anomaly-occurring portion determination unit 342 is explained by specific examples. The following Case 1 to Case 3 are cases where a reproducible error (error that occurs again even if retried) occurred.

<Case 1: When Reproducible Error has Occurred by HDD Anomaly>

The score increase processor 351 of the anomaly-occurring portion determination unit 342 increases "Error score" within the device management table 310 corresponding to the HDD in which anomaly has occurred.

<Case 2: When Reproducible Error has Occurred by Transmission Path Anomaly>

The score increase processor 351 increases "Error score" within the device management table 310 corresponding to the SAS expander in which anomaly has occurred.

<Case 3: When Reproducible Undoubted-Portion-Unknown Error has Occurred>

The score increase processor 351 increases "Error score" within the device management table 310 corresponding to the HDD of the access destination and all the SAS expanders on the transmission path used for access.

Figure 11:
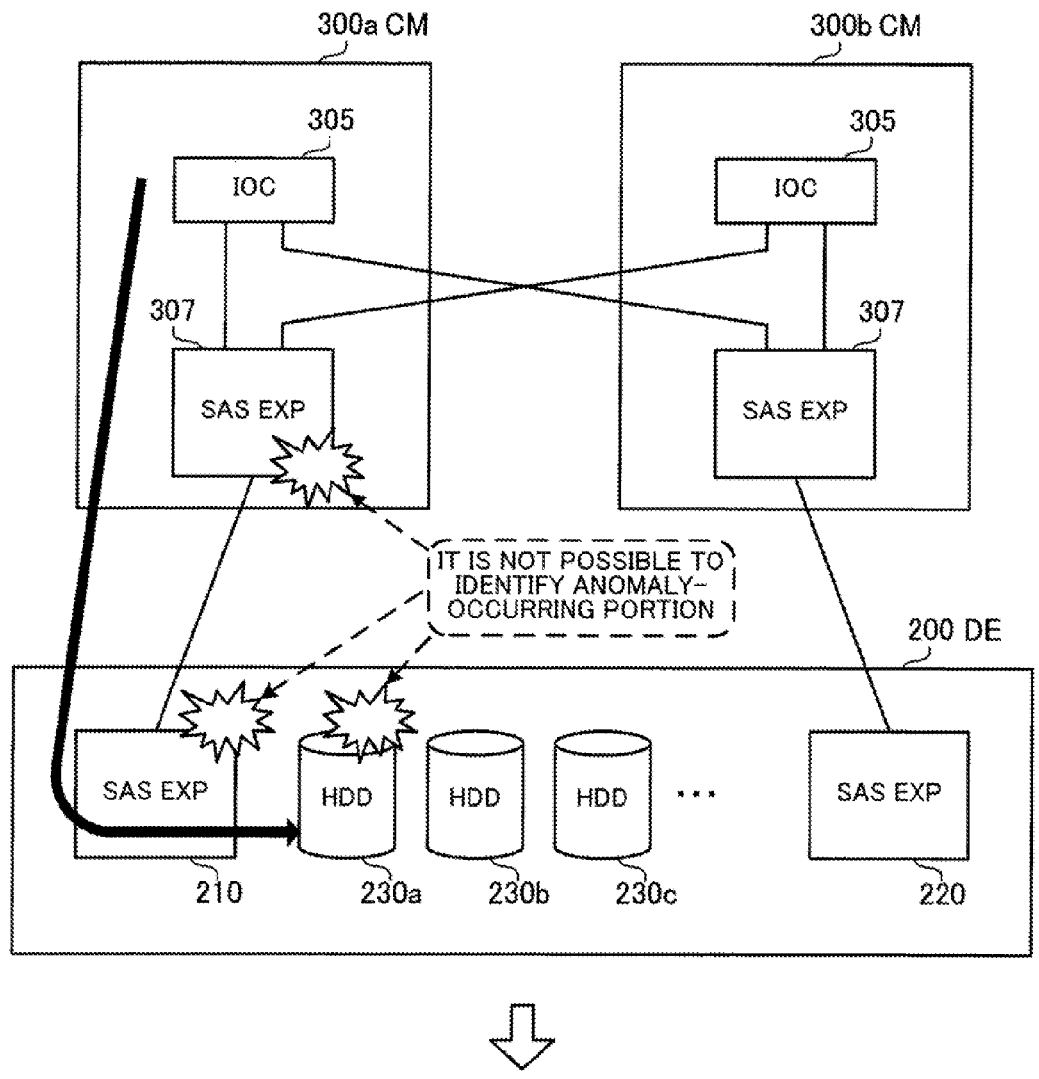
FIG. 11 illustrates an example of a state of Case 3.

Here, FIG. 11 illustrates an example of a state of Case 3.

FIG. 11 illustrates, as an example, a state where a reproducible undoubted-portion-unknown error has occurred when the controller module 300a accesses the HDD 230a of the drive enclosure 200. It is not possible for the score increase processor 351 of the controller module 300a (see FIG. 10) to determine whether the anomaly-occurring portion that has caused the error is the HDD 230 of the access destination or the SAS expander on the transmission path P0 used for the access (the SAS expander 307 of the controller module 300a or the SAS expander 210 of the drive enclosure 200). Consequently, the score increase processor 351 of the controller module 300a increases "Error score" within the device management table 310 corresponding to the HDD 230a, the SAS expander 307 of the controller module 300a, and the SAS expander 210 of the drive enclosure 200, respectively. Due to this, it is possible to prevent the occurrence of a failure in the HDD or the SAS expander from being overlooked.

Next, a case where a recovered error has occurred is illustrated.

<Case 4: When Recovered Error has Occurred by HDD Anomaly>

The score increase processor 351 of the anomaly-occurring portion determination unit 342 determines whether to increase the score according to the result of determination of whether data has redundancy by the data redundancy determination unit 352. When the data has redundancy, the score increase processor 351 increases "Error score" within the device management table 310 corresponding to the HDD of the access destination. On the other hand, when the data has no redundancy, the score increase processor 351 does not increase "Error score".

Figure 12:
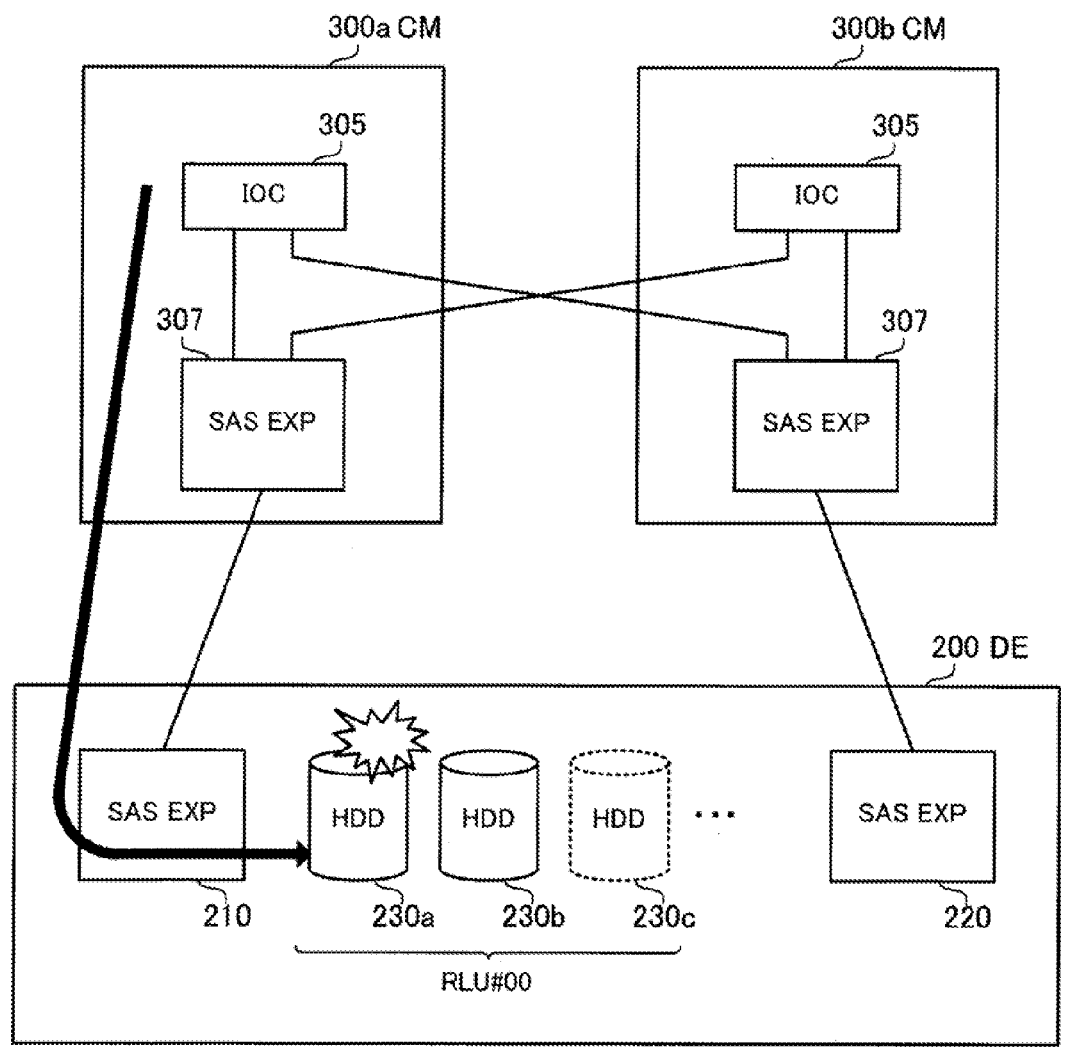
FIG. 12 illustrates an example of a state of Case 4.

FIG. 12 illustrates an example of a state of Case 4.

In FIG. 12, as an example, it is assumed that the HDDs 230a to 230c constitute one RAID group "RLU #00" and data is made redundant and recorded using these HDDs 230a to 230c in the controller module 300a. Further, it is also assumed that the RAID level of "RLU #00" is any of the RAIDs 1, 4, and 5. Then, it is assumed that a recovered error has occurred caused by the anomaly of the HDD 230a at the time of the access to the HDD 230a of the drive enclosure 200 from the controller module 300a.

At this time, when the data has redundancy in "RLU #00", that is, none of the HDDs 230a to 230c constituting "RLU #00" is disconnected, the score increase processor 351 of the controller module 300a (see FIG. 10) increases "Error score" of the device management table 310 corresponding to the HDD 230 of the access destination.

On the other hand, when the data has no redundancy in "RLU #00", the score increase processor 351 of the controller module 300a does not increase "Error score". FIG. 12 illustrates a state where the data has lost redundancy in "RLU #00" by the disconnection of the HDD 230c. If, in this state, "Error score" of the device management table 310 corresponding to the HDD 230a is increased, the possibility that the HDD 230a is disconnected is raised. In "RLU #00", the data has no redundancy, and therefore, if the HDD 230a is disconnected, it is no longer possible to access "RLU #00".

However, when the error that has occurred is a recovered error, the possibility is great that the anomaly that has occurred in the HDD 230a is not so serious one which needs measures immediately, and therefore, the possibility is great that the continuous use of the HDD 230a without disconnecting it causes no problem. Because of this, as illustrated in FIG. 12, the score increase processor 351 does not increase "Error score" not only of the device on the transmission path but also of the HDD 230a of the access destination when the data has no redundancy at the time of the occurrence of the recovered error caused by the occurrence of anomaly in the HDD 230a. Due to this, the state where the HDD 230a is disconnected and "RLU #00" is no longer accessible is made hard to occur and it is made possible to continuously use the HDD 230a.

<Case 5: When Recovered Error has Occurred by Transmission Path Anomaly>

The score increase processor 351 of the controller module 300a determines whether to increase the score according to the result of determination of whether the transmission path has redundancy by the transmission path redundancy determination unit 353. When the transmission path has redundancy, the score increase processor 351 increases "Error score" within the device management table 310 corresponding to the SAS expander in which anomaly has occurred. On the other hand, when the transmission path has no redundancy, the score increase processor 351 does not increase "Error score".

Figure 13:
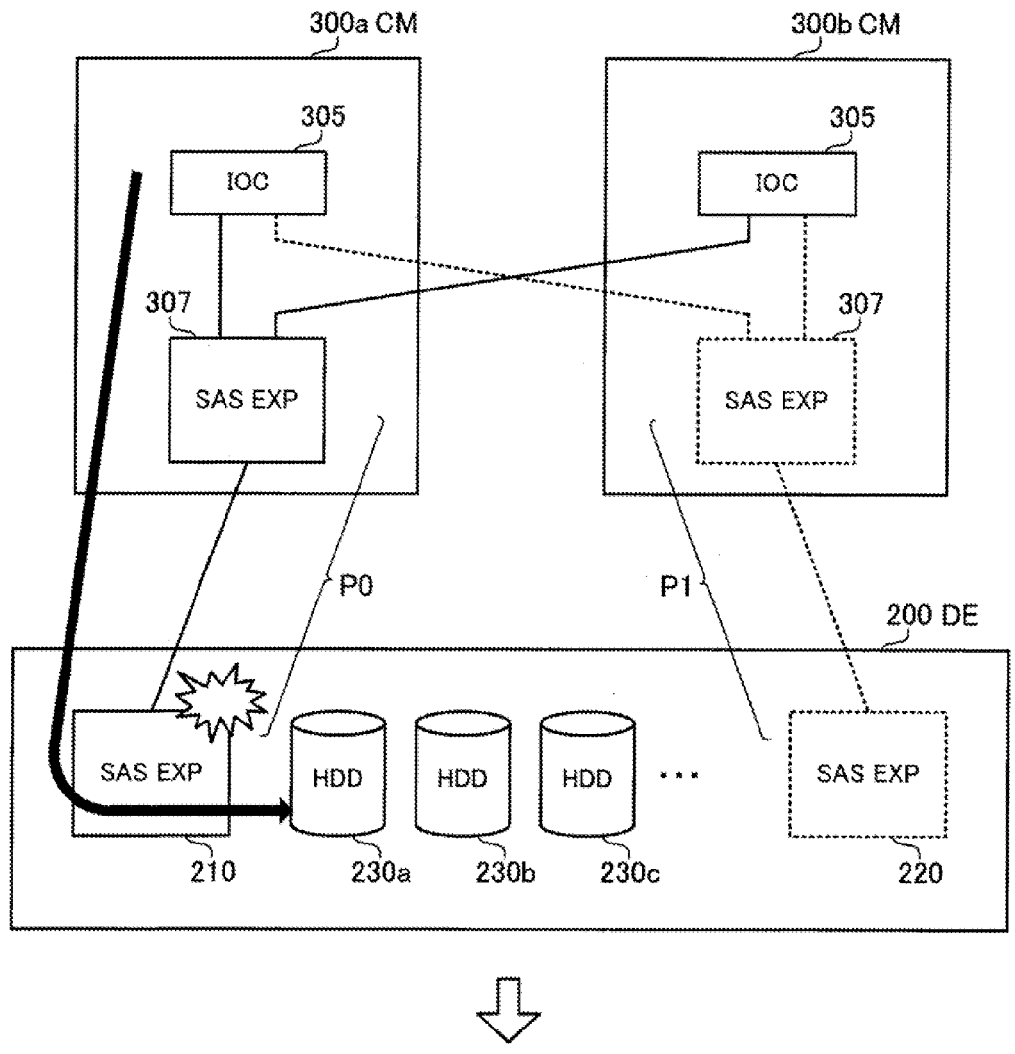
FIG. 13 illustrates an example of a state of Case 5.

FIG. 13 illustrates an example of a state of Case 5.

FIG. 13 illustrates, as an example, the state where a recovered error has occurred by the anomaly of the device on the transmission path upon access to the HDD 230a of the drive enclosure 200 from the controller module 300a. At this time, when the transmission path has redundancy, that is, neither the transmission path P0 nor the transmission path P1 is disconnected, the score increase processor 351 of the controller module 300a (see FIG. 10) increases "Error score" of the device management table 310 corresponding to the SAS expander (the SAS expander 307 of the controller module 300a or the SAS expander 210 of the drive enclosure 200) in which the anomaly has occurred.

On the other hand, when the transmission path has no redundancy, the score increase processor 351 of the controller module 300a does not increase "Error score". FIG. 13 illustrates a state where the transmission path has lost redundancy by the disconnection of the transmission path P1. If, in this state, "Error score" of the SAS expander 307 of the controller module 300a or the SAS expander 210 of the drive enclosure 200 is increased, the possibility of the disconnection of the transmission path P0 is raised. The transmission path P1 has already been disconnected, and therefore, if the transmission path P0 is disconnected, it is no longer possible for the controller module 300a to access the drive enclosure 200.

However, when the error that has occurred is a recovered error, the possibility is great that the anomaly that has occurred in the SAS expander on the transmission path P0 is not so serious one which needs measures immediately, and therefore, the possibility is great that the continuous use of the transmission path P0 without disconnecting it causes no problem. Because of this, as illustrated in FIG. 13, the score increase processor 351 does not increase "Error score" not only of the HDD 230a of the access destination but also the SAS expander on the transmission path when the transmission path has no redundancy at the time of the occurrence of the recovered error caused by the occurrence of anomaly in the SAS expander on the transmission path 0. Due to this, the state where the transmission path 0 is disconnected and the drive enclosure 200 is no longer accessible is made hard to occur and it is made possible to continuously access the drive enclosure 200.

<Case 6: When Undoubted-Portion-Unknown Recovered Error has Occurred>

The score increase processor 351 of the controller module 300a determines a device the score of which is to be increased or whether to increase the score of the device based on the results of determination by the data redundancy determination unit 352, the transmission path redundancy determination unit 353, and the sub determination unit 354, respectively.

When the data has redundancy and the transmission path also has redundancy, the score increase processor 351 increases "Error score" within the device management table 310 corresponding to the HDD of the access destination and all the SAS expanders on the transmission path used for the access as in Case 3 described above. Due to this, it is possible to prevent the occurrence of a failure in the HDD or SAS expander from being overlooked.

When the data has no redundancy and the transmission path also has no redundancy, the score increase processor 351 does not increase "Error score". Due to this, it is made possible to continue the access to the same HDD.

Further, when one of the data and the transmission path has redundancy and the other has no redundancy, the score increase processor 351 narrows the range of the anomaly-occurring portion based on the result of determination by the sub determination unit 354.

Figure 14:
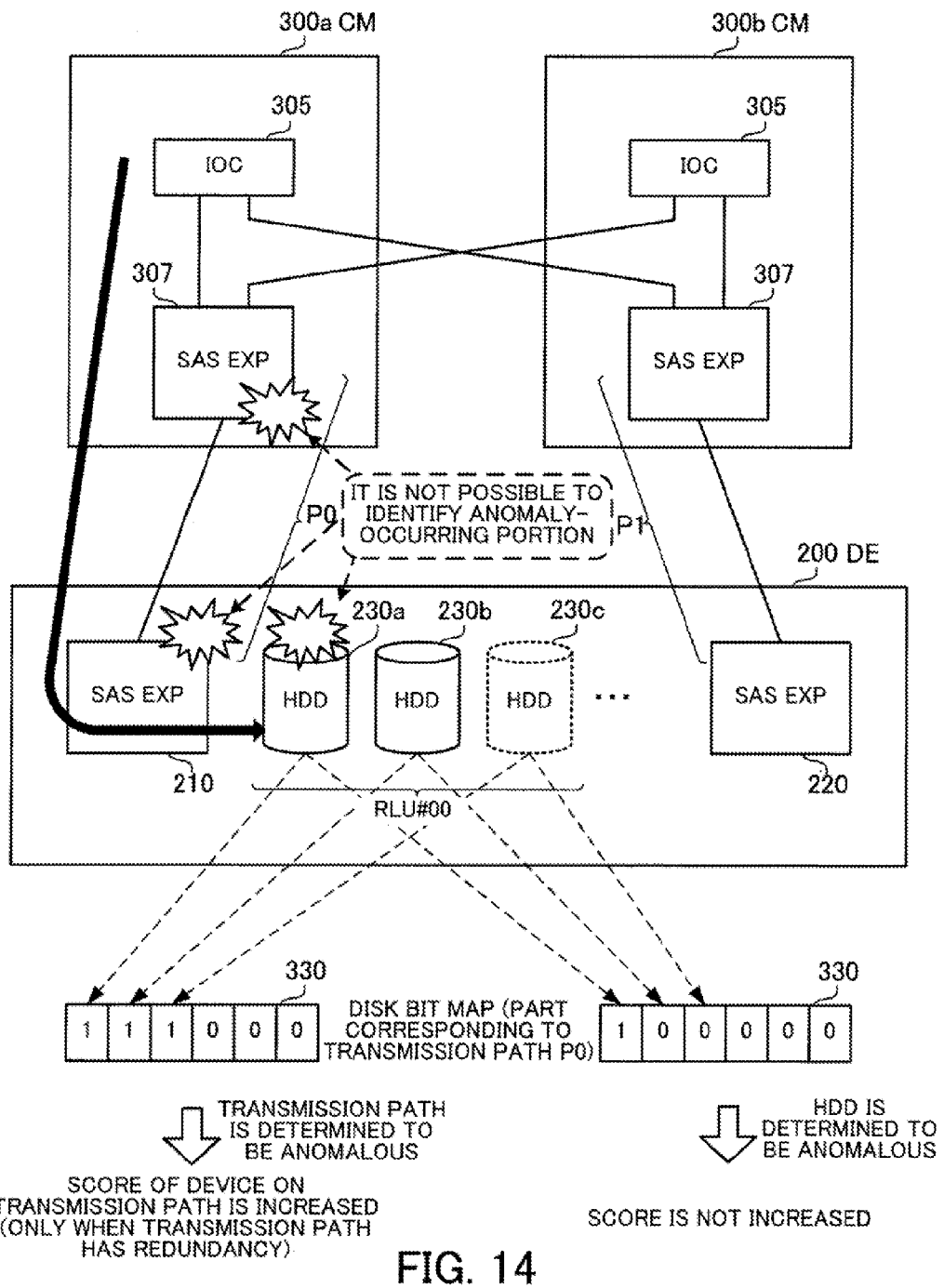
FIG. 14 illustrates an example of a state of Case 6.

FIG. 14 illustrates an example of a state of Case 6.

FIG. 14 illustrates, as an example, a state where the HDD 230a to 230c constitute one RAID group "RLU #00" in the controller module 300a, but the HDD 230c is disconnected, and therefore, the data has no redundancy in "RLU #00". It is assumed that the transmission path between the controller module 300a and the drive enclosure 200 has redundancy.

It is assumed that an undoubted-portion-unknown recovered error has occurred upon access to the HDD 230a of the enclosure 200 from the controller module 300a in this state. At this time, the score increase processor 351 of the controller module 300a (see FIG. 10) does not increase "Error score" of the device management table 310 corresponding to the HDD 230a of the access destination. Due to this, it is made possible to continue the access to "RLU #00".

However, if "Error score" corresponding to the SAS expander on the transmission path 0 is increased, "Error score" of the HDD 230a does not increase but only "Error score" of the SAS expander on the transmission path P0 increases when the recovered error continues to occur afterward by the same cause. If the cause of occurrence of the recovered error is not the transmission path P0 but the HDD 230a, such a problem is brought about that the HDD 230a that should be naturally disconnected is not disconnected but the transmission path P0 in which no failure has occurred is disconnected.

In order to make hard such a state where the transmission path P0 is disconnected erroneously to occur, the score increase processor 351 of the controller module 300a determines whether or not to increase "Error score" of the SAS expander on the transmission path P0 based on the result of determination by the sub determination unit 354 (see FIG. 10). The sub determination unit 354 refers to a bit group corresponding to the transmission path P0 in the disk bit map 330 (see FIG. 9 and FIG. 10).

Here, in the bit group that is referred to, when at least one of bits corresponding to the HDD other than the HDD 230a of the access destination is "1", it is possible to infer that the possibility of the occurrence of the similar recovered error in the past through the same transmission path P0 is great. In this case, the possibility that the anomaly-occurring portion is the SAS expander on the transmission path P0 is greater than the possibility that the anomaly-occurring portion is the HDD 230a. Consequently, as illustrated at the bottom-left in FIG. 14, when at least one of bits corresponding to the HDD other than the HDD 230a of the access destination of the bit group that is referred to is "1", the sub determination unit 354 determines that anomaly has occurred in the device on the transmission path P0. In this case, the score increase processor 351 increases "Error score" of the device management table 310 corresponding to each SAS expander on the transmission path P0.

On the other hand, as illustrated at the bottom-right in FIG. 14, when all the bits corresponding to the HDDs other than the HDD 230a of the access destination of the bit group that is referred to are "0", the sub determination unit 354 determines that anomaly has occurred in the HDD 230a. In this case, the score increase processor 351 does not increase "Error score".

As described above, by determining whether or not to increase "Error score" of the device on the transmission path based on the result of determination by the sub determination unit 354, it is possible to accurately determine whether or not the anomaly-occurring portion is the device on the transmission path. As a result of that, a state where the HDD that should be naturally disconnected is not disconnected but the transmission path in which no failure has occurred is disconnected is made hard to occur.

Figure 15:
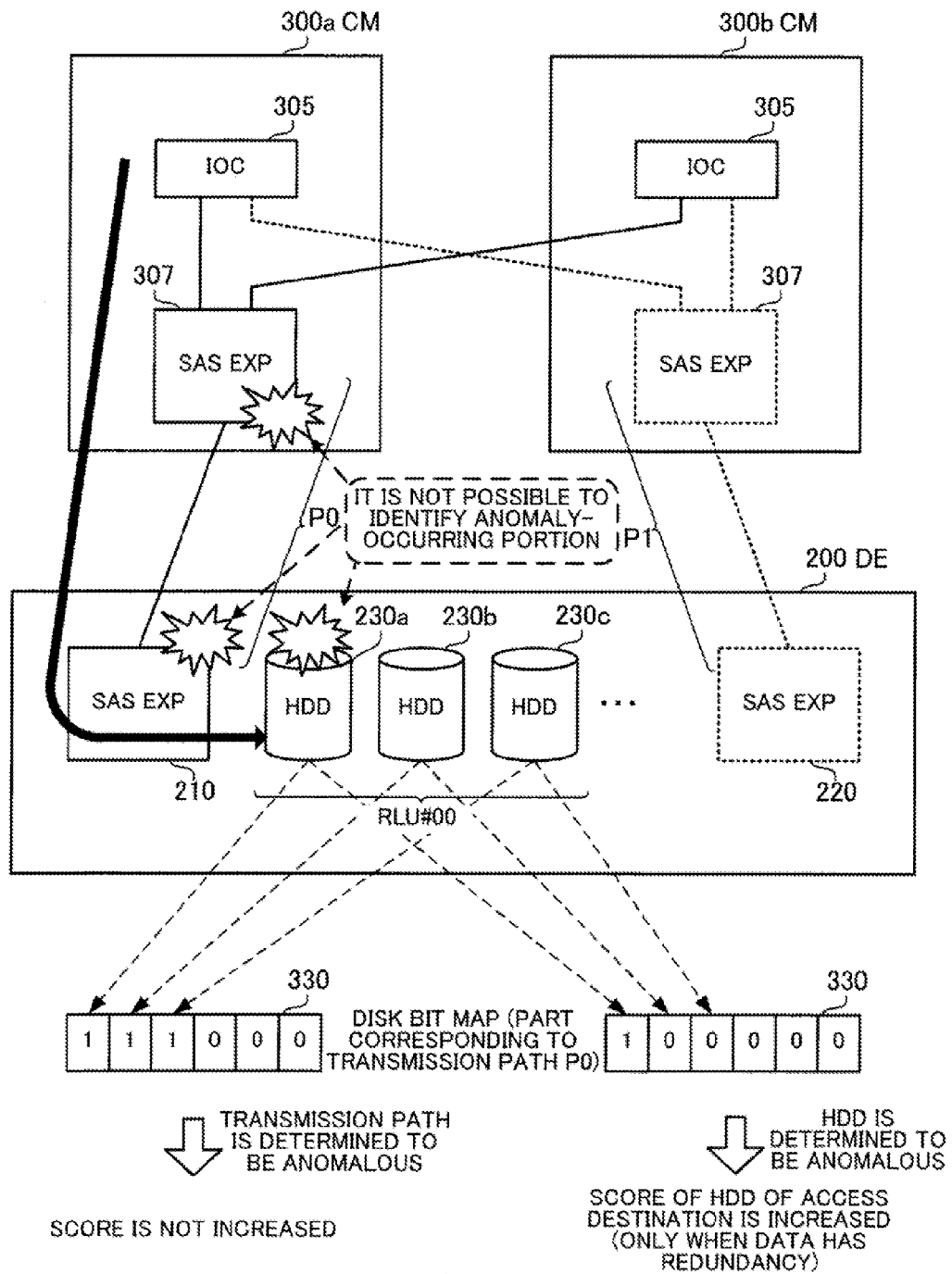
FIG. 15 illustrates another example of a state of Case 6.

FIG. 15 illustrates another example of a state of Case 6.

In FIG. 15, as an example, in the controller module 300a, the HDDs 230a to 230c constitute one RAID group "RLU #00" and control is performed so that data is made redundant using the HDDs 230a to 230c. However, it is assumed that the transmission path P1 is disconnected, and therefore, the transmission path between the controller module 300a and the drive enclosure 200 has no redundancy. It is assumed that an undoubted-portion-unknown recovered error has occurred upon access to the HDD 230a of the drive enclosure 200 from the controller module 300a in such a state. At this time, the score increase processor 351 of controller module 300a (see FIG. 10) does not increase "Error score" of the device management table 310 corresponding to the SAS expander on the transmission path P0 used for the access. Due to this, it is made possible to continue the access to the drive enclosure 200.

However, if "Error score" corresponding to the HDD 230a of the access destination is increased, "Error score" of the SAS expander on the transmission path P0 does not increase but only "Error score" of the HDD 230a increases when the recovered error continues to occur afterward by the same cause. If the cause of occurrence of the recovered error is not the HDD 230a but the SAS expander on the transmission path P0, such a problem is brought about that the transmission path P0 that should be naturally disconnected is not disconnected but the HDD 230a in which not failure has occurred is disconnected.

In order to make hard such a state where the HDD 230a is disconnected erroneously to occur, the score increase processor 351 of the controller module 300a determines whether or not to increase "Error score" of the HDD 230a of the access destination based on the result of determination by the sub determination unit 354 (see FIG. 10). The sub determination unit 354 refers to a bit group corresponding to the transmission path P0 in the disk bit map 330 (see FIG. 9 and FIG. 10).

Here, when all the bits corresponding to the HDD other than the HDD 230a of the access destination of the bit group that is referred to is "0", it is indicated that the recovered error occurred only upon access to the HDD 230a of the HDDs within the drive enclosure 200. In this case, the possibility that the anomaly-occurring portion is the HDD 230a is greater than the possibility that the anomaly-occurring portion is the SAS expander on the transmission path P0. Consequently, as illustrated at the bottom-right in FIG. 15, when all the bits corresponding to the HDDs other than the HDD 230a of the access destination of the bit group that is referred to are "0", the sub determination unit 354 determines that anomaly has occurred in the HDD 230a. In this case, the score increase processor 351 increases "Error score" of the device management table 310 corresponding to the HDD 230a.

On the other hand, as illustrated at the bottom-left in FIG. 15, when at least one of bits corresponding to the HDD other than the HDD 230a of the access destination of the bit group that is referred to is "1", the sub determination unit 354 determines that anomaly has occurred in any of the SAS expanders on the transmission path P0. In this case, the score increase processor 351 does not increase "Error score".

As described above, by determining whether or not to increase "Error score" of the HDD of the access destination based on the result of determination by the sub determination unit 354, it is possible to accurately determine whether or not the anomaly-occurring portion is the HDD of the access destination. As a result of that, a state where the transmission path that should be naturally disconnected is not disconnected but the HDD in which no failure has occurred is disconnected is made hard to occur.

Figure 16:
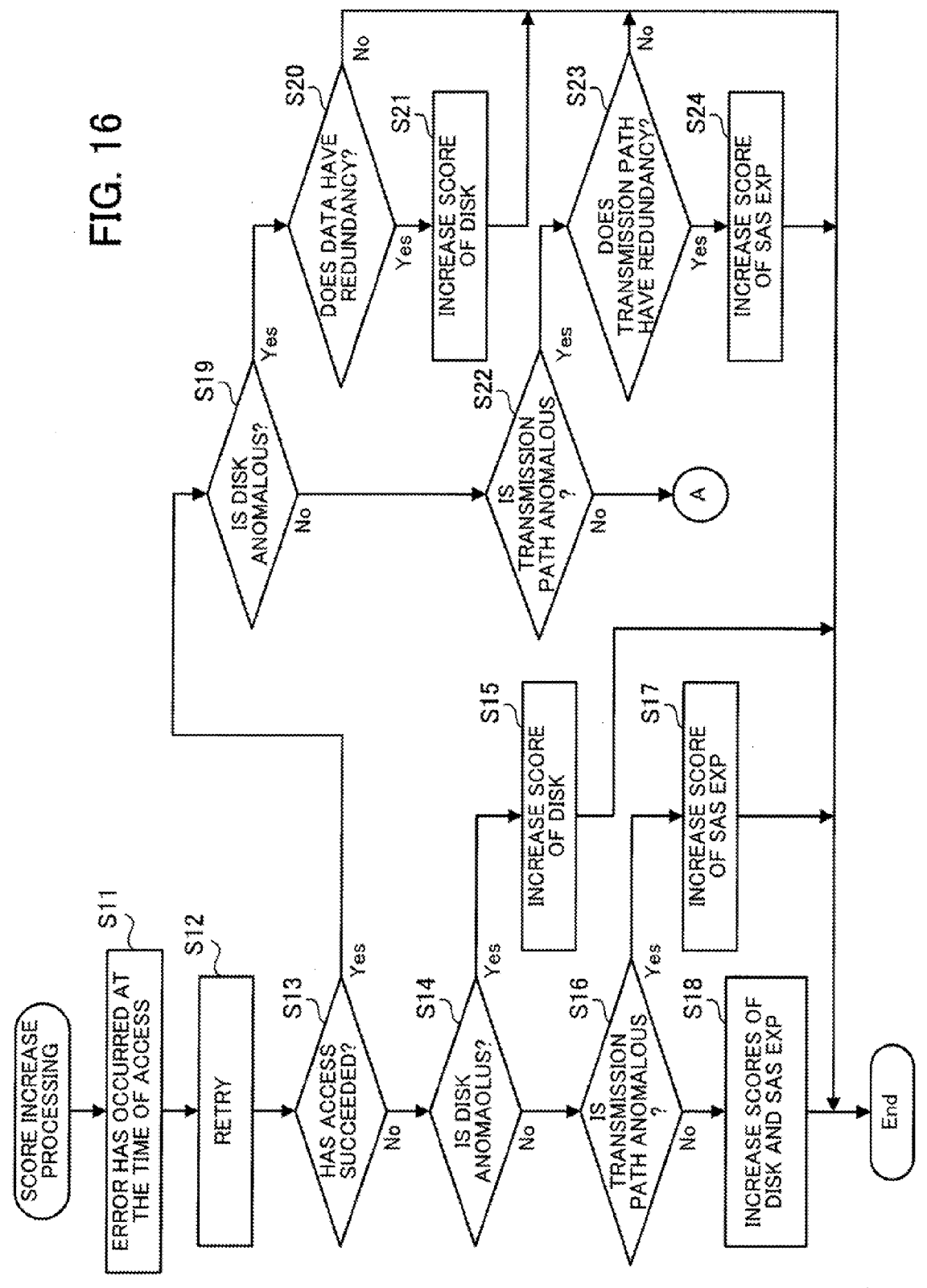
Figure 17:
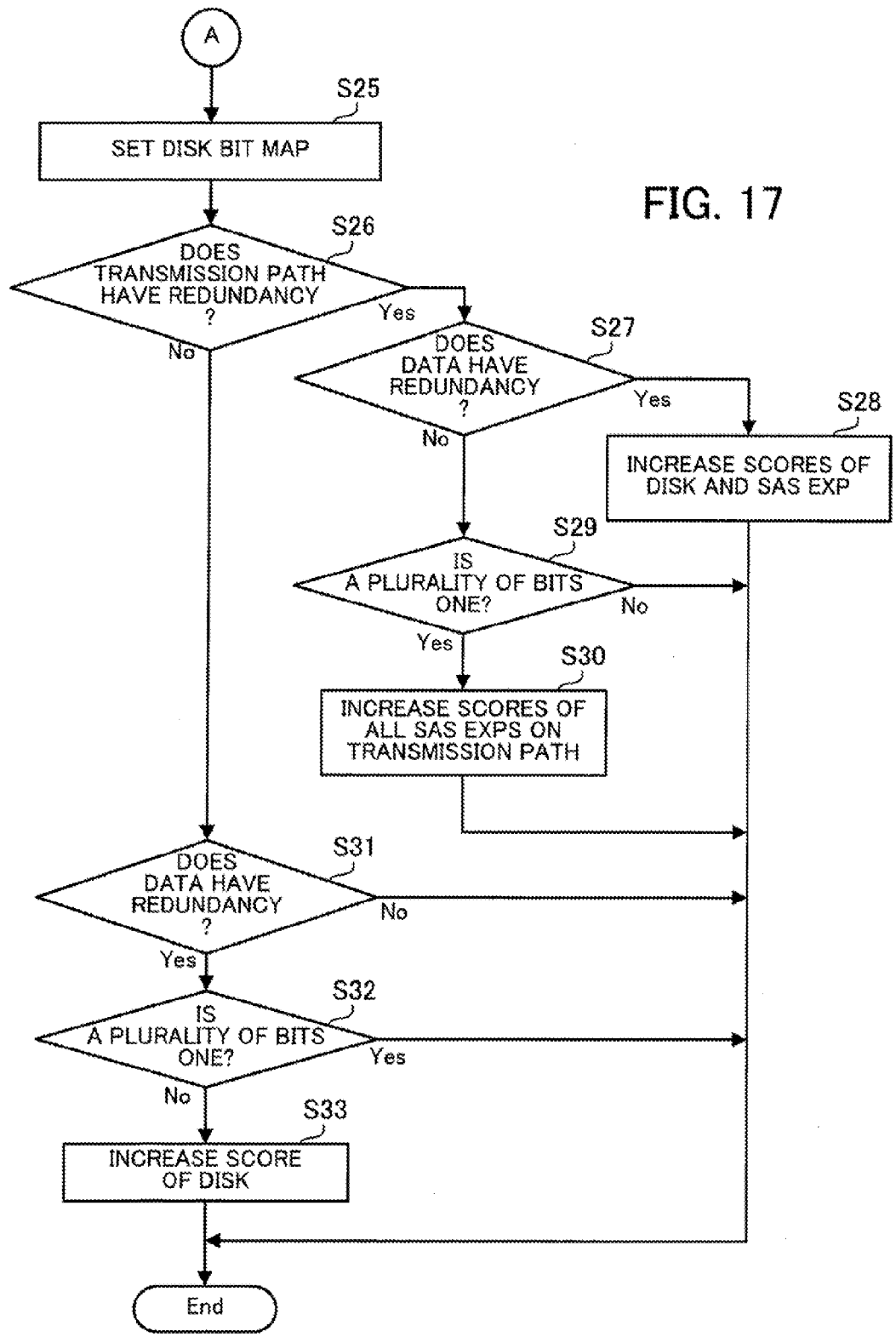
FIG. 17 is a flowchart (Part 2) illustrating an example of a processing procedure when an error occurs in a CM.

Next, a determination processing procedure including Case 1 to Case 6 described above is explained using a flowchart. FIG. 16 and FIG. 17 are a flowchart illustrating a processing procedure when an error occurred in the controller module.

(Step S11) When an error occurred upon access to any of the HDDs within the drive enclosure 200 by the access controller 341 of the controller module 300a in response to a request from the host device 110, the processing of step S12 and subsequent steps is performed.

(Step S12) The access controller 341 retries the same access processing as that of step S11.

(Step S13) When the error occurred again in retrying at step S12 (that is, when a reproducible error occurred. S13: No), the processing of step S14 is performed. On the other hand, when the access has succeeded at step S12 (that is, when the error that has occurred at step S11 is a recovered error. S13: Yes), the processing of step S19 is performed.

(Step S14) The score increase processor 351 of the controller module 300a determines whether the anomaly-occurring portion is the HDD of the access destination of steps S11 and S12. For example, the score increase processor 351 determines whether the anomaly-occurring portion is the HDD of the access destination based on the sense information that the access controller 341 has received from the HDD of the access destination at step S11 or step S12. When determining that the anomaly-occurring portion is the HDD (S14: Yes), the score increase processor 351 performs the processing of step S15 and on the other hand, when determining that the anomaly-occurring portion is not the HDD (S14: No), the score increase processor 351 performs the processing of step S16.

(Step S15) The score increase processor 351 increases "Error score" of the device management table 310 corresponding to the HDD of the access destination.

(Step S16) The score increase processor 351 determines whether the anomaly-occurring portion is the device on the transmission path used for the access of step S11 and step S12. For example, the score increase processor 351 determines that the anomaly-occurring portion is the device on the transmission path if the access controller 341 has received the sense information from the SAS expander on the transmission path or there is no response to the access by the access controller 341 within a fixed period of time at step S11 or step S12. When determining that the anomaly-occurring portion is the device on the transmission path (S16: Yes), the score increase processor 351 performs the processing of step S17 and on the other hand, when determining that the anomaly-occurring portion is not the device on the transmission path (S16: No), the score increase processor 351 performs the processing of step S18.

(Step S17) The score increase processor 351 increases "Error score" of the device management table 310 about the SAS expander in which anomaly has occurred of the SAS expanders on the transmission path used for the access of steps S11 and S12.

If the access controller 341 has received sense information from the SAS expander on the transmission path at, for example, step S11 or step S12, the score increase processor 351 determines that the SAS expander from which the sense information is transmitted to be the anomaly-occurring portion. Further, when there is no response to the access by the access controller 341 at step S11 or step S12 for a fixed period of time, the score increase processor 351 determines that the SAS expander nearest to the IOC 305 of the controller module 300a of the SAS expanders on the transmission path that is used to be the anomaly-occurring portion.

(Step S18) The score increase processor 351 increases "Error score" of the device management table 310 about the HDD of the access destination and the SAS expander on the transmission path that is used, respectively.

(Step S19) When a recovered error occurred (S13: Yes), the score increase processor 351 determines whether the anomaly-occurring portion is the HDD of the access destination by the same processing procedure as that at step S14. When determining that the anomaly-occurring portion is the HDD (S19: Yes), the score increase processor 351 performs the processing of step S20 and on the other hand, when determining that the anomaly-occurring portion is not the HDD (S19: No), the score increase processor 351 performs the processing of step S22.

(Step S20) The data redundancy determination unit 352 of the controller module 300a refers to "Status" about each HDD associated with the RAID group to which the access destination at steps S11 and S12 belongs from the RAID management table 320. When each "Status" associated with the RAID group is "1", the data redundancy determination unit 352 determines that the data to be accessed has redundancy. On the other hand, when any one of "Status" associated with the RAID group is "0", the data redundancy determination unit 352 determines that the data to be accessed has no redundancy. It may also be possible for the disconnection controller 343 to register flag information indicating whether or not data has redundancy for each RAID group in the RAID management table 320.

When the data is determined to have redundancy by the data redundancy determination unit 352 (S20: Yes), the score increase processor 351 performs the processing of step S21. On the other hand, when the data has no redundancy (S20: No), the score increase processor 351 exits the processing without increasing "Error score" of the device management table 310.

(Step S21) The score increase processor 351 increases "Error score" of the device management table 310 corresponding to the HDD of the access destination.

(Step S22) The score increase processor 351 determines whether the anomaly-occurring portion is the device on the transmission path by the same processing procedure as that at step S16. When determining that the anomaly-occurring portion is the device on the transmission path (S22 Yes), the score increase processor 351 performs the processing of step S23. On the other hand, when determining that the anomaly-occurring portion is not the device on the transmission path (S22: No), the score increase processor 351 performs the processing of step S25.

(Step S23) The transmission path redundancy determination unit 353 of the controller module 300a refers to "Status" associated with the devices belonging to the transmission paths P0 and P1, respectively in the device management table 310. When there is at least one device whose "Status" is "0" of the devices belonging to the transmission paths P0 and P1, respectively, the transmission path redundancy determination unit 353 determines that the transmission path has no redundancy. It may also be possible for the disconnection controller 343 to register flag information indicating whether or not the transmission path has redundancy in the device management table 310.

When the transmission path is determined to have redundancy by the transmission path redundancy determination unit 353 (S23: Yes), the score increase processor 351 performs the processing of step S24. On the other hand, when the transmission path has no redundancy (S23: No), the score increase processor 351 exits the processing without increasing "Error score" of the device management table 310.

(Step S24) The score increase processor 351 increases "Error score" of the device management table 310 about the SAS expander in which anomaly has occurred by the same processing procedure as that at step S17.

(Step S25) When a recovered error has occurred (S13: Yes) but it is not possible to identify the anomaly-occurring portion (S19: No, S22: No), the score increase processor 351 sets the bits corresponding to the HDD of the access destination and the transmission path used at the time of access among the bits of the disk bit map 330 to "1".

For example, it may also be possible for the score increase processor 351 to synchronize the disk bit map 330 held by the controller module 300a and the disk bit map 330 held by the controller module 300b with each other by notifying the other controller module 300b of the bits that are set when the score increase processor 351 sets "1" to the bits of the disk bit map 330.

Further, it may also be possible for the score increase processor 351 to return the value of the bits to "0" when a fixed period of time elapses after setting "1" to the bits of the disk bit map 330. Due to this, it is possible to prevent the processing of determining the anomaly-occurring portion by the sub determination unit 354 from being affected by the error that occurred extremely previously, which is slightly associated with the error that has occurred at the time of determination, and therefore, it is possible to improve determination precision of the sub determination unit 354.

(Step S26) The transmission path redundancy determination unit 353 of the controller module 300a determines whether the transmission path has redundancy based on the device management table 310 by the same processing procedure as that at step S23. When the transmission path is determined to have redundancy by the transmission path redundancy determination unit 353 (S26: Yes), the score increase processor 351 performs the processing of step S27. On the other hand, when the transmission path has no redundancy (S26: No), the score increase processor 351 performs the processing of step S31.

(Step S27) The data redundancy determination unit 352 of the controller module 300a determines whether the data to be accessed has redundancy based on the RAID management table 320 by the same processing procedure as that at step S20. When the data is determined to have redundancy by the data redundancy determination unit 352 (S27: Yes), the score increase processor 351 performs the processing of step S28. On the other hand, when the data has no redundancy (S27: No), the score increase processor 351 performs the processing of step S29.

(Step S28) The score increase processor 351 increases "Error score" corresponding to the HDD of the access destination at steps S11 and S12 and all the SAS expanders on the transmission path used for the access at steps S11 and S12 in the device management table 310.

(Step S29) The score increase processor 351 requests the sub determination unit 354 to perform processing of determining an anomaly-occurring portion. The sub determination unit 354 refers to the bit group corresponding to the transmission path used at steps S11 and S12 of the bits of the disk bit map 330. When two or more bits in the bit group that is referred to are "1", the sub determination unit 354 determines that anomaly has occurred in the device on the transmission path used at steps S11 and S12. On the other hand, when only one bit is set to "1" in the bit group that is referred to, the sub determination unit 354 determines that anomaly has occurred in the HDD of the access destination at steps S11 and S12.

When the sub determination unit 354 determines that anomaly has occurred in the device on the transmission path (S29 Yes), the score increase processor 351 performs the processing of the step S30. On the other hand, when the sub determination unit 354 determines that anomaly has occurred in the HDD of the access destination (S29: No), the score increase processor 351 exits the processing without increasing "Error score" of the device management table 310.

(Step S30) The score increase processor 351 increases "Error score" corresponding to all the SAS expanders on the transmission path used for the access at steps S11 and S12 in the device management table 310.

(Step S31) The data redundancy determination unit 352 determines whether the data to be accessed has redundancy based on the RAID management table 320 by the same processing procedure as that at step S20. When the data is determined to have redundancy by the data redundancy determination unit 352 (S31: Yes), the score increase processor 351 performs the processing of step S32. On the other hand, when the data has not redundancy (S31: No), the score increase processor 351 exits the processing without increasing "Error score" of the device management table 310.

(Step S32) The score increase processor 351 requests the sub determination unit 354 to perform processing of determining an anomaly-occurring portion. The sub determination unit 354 determines whether the anomaly-occurring portion is the HDD of the access destination or the device on the transmission path used for access by the same processing procedure as that at step S30.

When the sub determination unit 354 determines that anomaly has occurred in the HDD of the access destination (S32: No), the score increase processor 351 performs the processing of the step S33. On the other hand, when the sub determination unit 354 determines that anomaly has occurred in the device on the transmission path (S32: Yes), the score increase processor 351 exits the processing without increasing "Error score" of the device management table 310.

(Step S33) The score increase processor 351 increases "Error score" of the device management table 310 corresponding to the HDD of the access destination.

It may also be possible for the score increase processor 351 of the controller module 300a to synchronize the device management table 310 held by the controller module 300a and the device management table 310 held by the other controller module 300b with each other by notifying the other controller module 300b of information for identifying the device the score of which is increased when the score increase processor 351 increases "Error score" in the processing in FIG. 16 and FIG. 17 described above.

Figure 18:
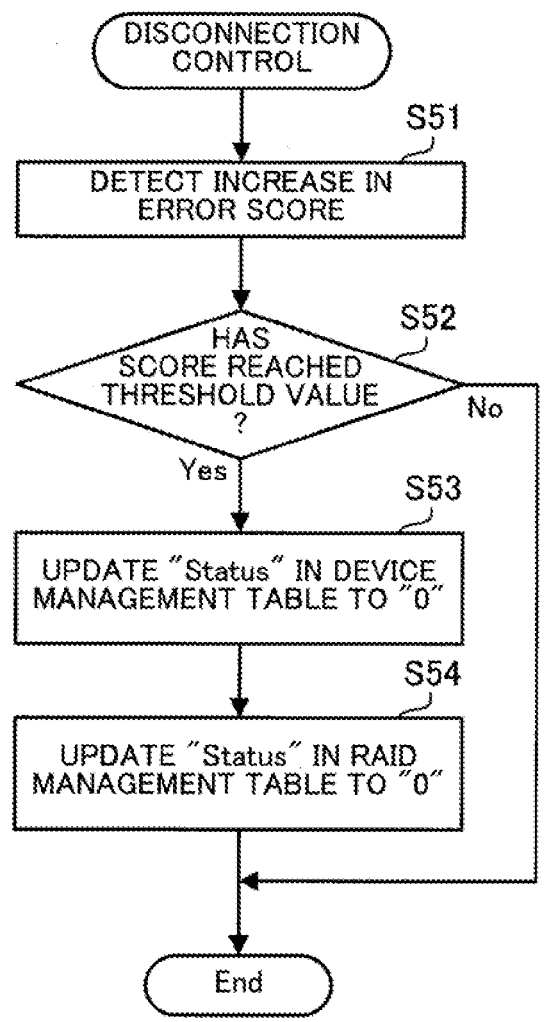
FIG. 18 illustrates an example of a processing procedure of a disconnection controller.

Next, FIG. 18 illustrates an example of a processing procedure of the disconnection controller.

(Step S51) When detecting that "Error score" of the device management table 310 is increased, the disconnection controller 343 of the controller module 300a performs the processing of step S52 and the subsequent steps. It may also be possible for the disconnection controller 343 to perform the processing of step S52 and the subsequent steps upon receipt of notification that "Error score" is updated from, for example, the score increase processor 351.

(Step S52) The disconnection controller 343 determines whether the value of "Error score" increased at step S51 has reached a predetermined threshold value. When the value of "Error score" has reached the threshold value (S52: Yes), the disconnection controller 343 performs the processing of step S53. On the other hand, when the value of "Error score" has not reached the threshold value yet (S52: No), the disconnection controller 343 exits the processing.

(Step S53) The disconnection controller 343 updates "Status" corresponding to the device whose "Error score" is increased at step S51 from "1" to "0" of "Status" within the device management table 310.

It may also be possible for the disconnection controller 343 to synchronize the device management table 310 held by the controller module 300a and the device management table 310 held by the other controller module 300b with each other by, for example, notifying the other controller module 300b of information for identifying the device corresponding to the updated "Status" when the disconnection controller 343 updates "Status" within the device management table 310.

(Step S54) This step S54 is performed when "Status" associated with the HDD is updated at step S53. The disconnection controller 343 updates "Status" from "1" to "0", which is associated with the HDD whose "Status" is updated at step S53 of the HDDs registered in "Used disk" in the RAID management table 320.

By the processing in FIG. 18 described above, the device whose "Error score" has reached a fixed value is disconnected from the controller module 300a and brought into a state where the device is not available.

According to the third embodiment explained as above, when a recovered error occurred, it is possible to continue the operation of the system as long as possible. At the same time, the determination precision of an anomaly-occurring portion when an undoubted-portion-unknown recovered error occurred is improved and it is possible to reduce the probability of the occurrence of a state where a device that is not defective is disconnected erroneously.

It is possible to implement the processing functions of the controller and the controller module in each embodiment described above by a computer. In such a case, the controller is provided with programs describing the contents of the processing of the functions that should be offered by the controller module and the above-mentioned processing functions are implemented on the computer executing the programs. It is possible to record the programs describing the contents of processing in a computer-readable recording medium. As a computer-readable recording medium, mention is made of a magnetic storage apparatus, an optical disk, a magneto-optical recording medium, a semiconductor memory, etc. As a magnetic storage apparatus, mention is made of a hard disk drive (HDD), a flexible disk (FD), a magnetic tape, etc. As an optical disk, mention is made of DVD, DVD-RAM, CD-ROM/RW, etc. As a magneto-optical recording medium, mention is made of a magneto-optical disk (MO).

To distribute programs, a portable recording medium, for example, a DVD, CD-ROM, etc., which records the programs is made available in the market. It is also possible to store the programs in a server computer and transfer the programs from the server computer to another computer via a network.

A computer that executes the programs stores the programs recorded in a portable recording medium or the programs transferred from the server computer in the storage apparatus of its own. Then, the computer reads the programs from the storage apparatus of its own and executes processing according to the programs. It is also possible for the computer to read the programs directly from the portable recording medium and execute processing according to the programs. Further, it is also possible for the computer to execute processing according to the programs received sequentially each time the program is transferred from the server computer connected via a network.

According to the storage system and the method for determining an anomaly-occurring portion disclosed above, precision of determination of an anomaly-occurring portion is improved while increasing the continuity of system operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage system comprising:
a plurality of storage apparatuses; and
a controller that accesses each of the plurality of storage apparatuses through a common transmission path and manages the plurality of storage apparatuses so that data to be recorded in the plurality of storage apparatuses is made redundant in the different storage apparatuses, wherein the controller performs a procedure comprising:
detecting an error occurred upon access to an access destination being one of the plurality of storage apparatuses;
determining, upon detection of the error, that the storage apparatus of the access destination is not an anomaly-occurring portion causing the error, when data to be accessed has no redundancy; and
determining, upon detection of the error, that the common transmission path is an anomaly-occurring portion causing the error, when the data to be accessed has no redundancy and when there is a record of a past error in access to the storage apparatuses other than the storage apparatus of the access destination.

2. The storage system according to claim 1, wherein the procedure further comprises:
referring to an error score table individually retaining a score in accordance with the occurrence of an error for each of the plurality of storage apparatuses and for the common transmission path, and not allowing use of the storage apparatus or the common transmission path whose score in the error score table has reached a predetermined threshold value; and
when the data to be accessed has no redundancy at the time of the occurrence of the error, adding a score to the common transmission path in the error score table when there is a record of a past error in access to the other storage apparatuses, and not adding a score to any of the storage apparatus of the access destination and the common transmission path in the error score table when there is no record of a past error in access to the other storage apparatuses.

3. The storage system according to claim 2, wherein the procedure further comprising:
when the data to be accessed has redundancy at the time of the occurrence of the error, adding a score to both the storage apparatus of the access destination and the common transmission path in the error score table.

4. The storage system according to claim 3, wherein the procedure further comprises:
when an occurring portion of the error is identified to be the storage apparatus of the access destination based on a response to the access to the storage apparatus, determining whether to add a score to the storage apparatus of the access destination in the error score table based on the determination result of whether the data to be accessed has redundancy, without adding a score to the common transmission path in the error score table; and when it is not possible to identify the occurring portion of the error based on the response to the access to the storage apparatus, determining whether to add a score to each of the storage apparatus of the access destination and the common transmission path in the error score table based on whether the data to be accessed has redundancy, and whether there is a record of a past error in access to the other storage apparatuses.

5. The storage system according to claim 4, wherein:

the controller accesses the plurality of storage apparatuses through a plurality of common transmission paths;

the error score table individually retains a score in accordance with the occurrence of an error for each of the plurality of storage apparatuses and for each of the plurality of common transmission paths; and the procedure further comprises not adding a score to any of the storage apparatus of the access destination and the common transmission path in the error score table when it is not possible to identify the occurring portion of the error based on the response to the access to the storage apparatus, and when the data to be accessed has no redundancy, and when the common transmission path that connects with the plurality of storage apparatuses has no redundancy.

6. The storage system according to claim 5, wherein the procedure further comprises:

when it is not possible to identify the occurring portion of the error based on the response to the access to the storage apparatus and when determining that the common transmission path has not redundancy, adding a score to the storage apparatus of the access destination in the error score table when there is no record of a past error in access to the other storage apparatuses through the same common transmission path, and not adding a score to any of the common transmission path used for the access and the storage apparatus of the access destination in the error score table when there is a record of a past error in access to the other storage apparatuses through the same common transmission path.

7. A storage system comprising a plurality of storage apparatuses and a controller capable of accessing each of the plurality of storage apparatuses through a plurality of common transmission paths, wherein the controller performs a procedure comprising:

detecting an error occurred upon access to an access destination being one of the plurality of storage apparatuses through one of the common transmission paths; and determining, upon detection of the error, that the common transmission path used for the access is not an anomaly-occurring portion causing the error, when the common transmission path has no redundancy; and determining, upon detection of the error, that the storage apparatus of the access destination is an anomaly-occurring portion causing the error, when the common transmission path has no redundancy and when there is no record of a past error in access to the storage apparatuses other than the storage apparatus of the access destination through the same common transmission path.

8. The storage system according to claim 7, wherein the procedure further comprises:

referring to an error score table individually retaining a score in accordance with the occurrence of an error for each of the plurality of storage apparatuses and for the plurality of common transmission paths, and not allowing use of the storage apparatus or the common transmission path whose score in the error score table has reached a predetermined threshold value; and when the common transmission path has no redundancy at the time of the occurrence of the error, adding a score to the storage apparatus of the access destination in the error score table when there is no record of a past error in access to the other storage apparatuses, and not adding a score to any of the common transmission path used for the access and the storage apparatus of the access destination in the error score table when there is a record of a past error in access to the other storage apparatuses.

9. The storage system according to claim 8, wherein the procedure further comprises, when the common transmission path has redundancy, adding a score to both the common transmission path used for the access and the storage apparatus of the access destination in the error score table.

10. The storage system according to claim 9, wherein the procedure further comprises:

when an occurring portion of the error is identified to be the common transmission path used for the access based on a response to the access to the storage apparatus, determining whether to add a score to the common transmission path used for the access in the error score table based on whether the common transmission path has redundancy, without adding a score to the storage apparatus of the access destination in the error score table; and when it is not possible to identify the occurring portion of the error based on the response to the access to the storage apparatus, determining whether to add a score to each of the common transmission path used for the access and the storage apparatus of the access destination in the error score table based on whether the common transmission path has redundancy and whether there is a record of a past error in access to the other storage apparatuses.

11. A controller that accesses each of a plurality of storage apparatuses through a common transmission path and manages the plurality of storage apparatuses so that data to be recorded in the plurality of storage apparatuses is made redundant in the different storage apparatuses, the controller comprising:

one or more processors configured to perform a procedure comprising:

detecting an error occurred upon access to an access destination being one of the plurality of storage apparatuses;

determining, upon detection of the error, that the storage apparatus of the access destination is not an anomaly-occurring portion causing the error, when data to be accessed has no redundancy; and determining, upon detection of the error, that the common transmission path is an anomaly-occurring portion causing the error, when the data to be accessed has no redundancy and when there is a record of a past error in access to the storage apparatuses other than the storage apparatus of the access destination.

12. A controller capable of accessing each of a plurality of storage apparatuses through a plurality of common transmission paths, the controller comprising:

one or more processors configured to perform a procedure comprising: detecting an error occurred upon access to an access destination being one of the plurality of storage apparatuses, through one of the common transmission paths; and determining, upon detection of the error, that the common transmission path used for the access is not an anomaly-occurring portion causing the error, when the common transmission path has no redundancy; and determining, upon detection of the error, that the storage apparatus of the access destination is an anomaly-occurring portion causing the error, when the common transmission path has no redundancy and when there is no record of a past error in access to the storage apparatuses other than the storage apparatus of the access destination through the same common transmission path.

13. A method of determining an anomaly-occurring portion, executed by a computer that accesses each of a plurality of storage apparatuses through a common transmission path and manages the plurality of storage apparatuses so that data to be recorded in the plurality of storage apparatuses is made redundant in the different storage apparatuses, the method comprising:

detecting an error occurred upon access to an access destination being one of the plurality of storage apparatuses;

determining, upon detection of the error, that the storage apparatus of the access destination is not an anomaly-occurring portion causing the error, when data to be accessed has no redundancy; and determining, upon detection of the error, that the common transmission path is an anomaly-occurring portion causing the error, when the data to be accessed has no redundancy and when there is a record of a past error in access to the storage apparatuses other than the storage apparatus of the access destination.

14. The method of determining an anomaly-occurring portion according to claim 13, further comprising:

referring to an error score table individually retaining a score in accordance with the occurrence of an error for each of the plurality of storage apparatuses and for the common transmission path, and not allowing use of the storage apparatus or the common transmission path whose score in the error score table has reached a predetermined threshold value; and when the data to be accessed has no redundancy at the time of the occurrence of the error, adding a score to the common transmission path in the error score table when there is a record of a past error in access to the other storage apparatuses, and not adding a score to any of the storage apparatus of the access destination and the common transmission path in the error score table when there is no record of a past error in access to the other storage apparatuses.

15. The method of determining an anomaly-occurring portion according to claim 14, further comprising:

when the data to be accessed has redundancy at the time of the occurrence of the error, adding a score to both the storage apparatus of the access destination and the common transmission path in the error score table.

16. The method of determining an anomaly-occurring portion according to claim 15, further comprising:

when an occurring portion of the error is identified to be the storage apparatus of the access destination based on a response to the access to the storage apparatus, determining whether to add a score to the storage apparatus of the access destination in the error score table based on the determination result of whether the data to be accessed has redundancy, without adding a score to the common transmission path in the error score table; and when it is not possible to identify the occurring portion of the error based on the response to the access to the storage apparatus, determining whether to add a score to each of the storage apparatus of the access destination and the common transmission path in the error score table based on whether the data to be accessed has redundancy, and whether there is a record of a past error in access to the other storage apparatuses.

17. The method of determining an anomaly-occurring portion according to claim 16, wherein:

the computer accesses the plurality of storage apparatuses through a plurality of common transmission paths;

the error score table individually retains a score in accordance with the occurrence of an error for each of the plurality of storage apparatuses and for each of the plurality of common transmission paths; and the method further comprises not adding a score to any of the storage apparatus of the access destination and the common transmission path in the error score table when it is not possible to identify the occurring portion of the error based on the response to the access to the storage apparatus, and when the data to be accessed has no redundancy, and when the common transmission path that connects with the plurality of storage apparatuses has no redundancy.

18. The method of determining an anomaly-occurring portion according to claim 17, further comprising:

when it is not possible to identify the occurring portion of the error based on the response to the access to the storage apparatus and when determining that the common transmission path has not redundancy, adding a score to the storage apparatus of the access destination in the error score table when there is no record of a past error in access to the other storage apparatuses through the same common transmission path, and not adding a score to any of the common transmission path used for the access and the storage apparatus of the access destination in the error score table when there is a record of a past error in access to the other storage apparatuses through the same common transmission path.

19. A method of determining an anomaly-occurring portion, executed by a computer capable of accessing each of a plurality of storage apparatuses through a plurality of common transmission paths, the method comprising:

detecting an error occurred upon access to an access destination being one of the plurality of storage apparatuses through one of the common transmission paths; and determining, upon detection of the error, that the common transmission path used for the access is not an anomaly-occurring portion causing the error, when the common transmission path has no redundancy; and determining, upon detection of the error, that the storage apparatus of the access destination is an anomaly-occurring portion causing the error, when the common transmission path has no redundancy and when there is no record of a past error in access to the storage apparatuses other than the storage apparatus of the access destination through the same common transmission path.

20. The method of determining an anomaly-occurring portion according to claim 19, further comprising:

referring to an error score table individually retaining a score in accordance with the occurrence of an error for each of the plurality of storage apparatuses and for the plurality of common transmission paths, and not allowing use of the storage apparatus or the common transmission path whose score in the error score table has reached a predetermined threshold value; and when the common transmission path has no redundancy at the time of the occurrence of the error, adding a score to the storage apparatus of the access destination in the error score table when there is no record of a past error in access to the other storage apparatuses, and not adding a score to any of the common transmission path used for the access and the storage apparatus of the access destination in the error score table when there is a record of a past error in access to the other storage apparatuses.

* * * * *